US011739542B2

(12) United States Patent
Furrer et al.

(10) Patent No.: US 11,739,542 B2
(45) Date of Patent: Aug. 29, 2023

(54) SYSTEM FOR PLACING OBJECTS ON A SURFACE AND METHOD THEREOF

(71) Applicant: ETH SINGAPORE SEC LTD, Singapore (SG)

(72) Inventors: Jonas Michael Furrer, Uster (CH); Fabio Matteo Gramazio, Zurich (CH); Matthias Kohler, Riedikon (CH); Selen Ercan, Zurich (CH)

(73) Assignee: ETH SINGAPORE SEC LTD, Singapore (SG)

( * ) Notice: Subject to any disclaimer, the term of this patent is extended or adjusted under 35 U.S.C. 154(b) by 1185 days.

(21) Appl. No.: 16/338,318

(22) PCT Filed: Oct. 2, 2017

(86) PCT No.: PCT/SG2017/050495
§ 371 (c)(1),
(2) Date: Mar. 29, 2019

(87) PCT Pub. No.: WO2018/063100
PCT Pub. Date: Apr. 5, 2018

(65) Prior Publication Data
US 2020/0024853 A1 Jan. 23, 2020

(30) Foreign Application Priority Data
Sep. 30, 2016 (SG) .............. 10201608187P

(51) Int. Cl.
*B25J 9/16* (2006.01)
*E04F 21/22* (2006.01)
(Continued)

(52) U.S. Cl.
CPC ............. *E04F 21/22* (2013.01); *B25J 5/00* (2013.01); *B25J 9/0087* (2013.01); *B25J 9/163* (2013.01);
(Continued)

(58) Field of Classification Search
CPC ..... E04F 21/22; E04F 21/023; E04F 21/0076; E04F 21/1872; B25J 19/023; B25J 5/00;
(Continued)

(56) References Cited

U.S. PATENT DOCUMENTS 5,284,000 A    2/1994   Milne
7,641,461 B2   1/2010   Khoshnevis
(Continued)

FOREIGN PATENT DOCUMENTS

CN    201593296 U    9/2010
CN    201627350 U    11/2010
(Continued)

OTHER PUBLICATIONS

Krainin et al., Autonomous generation of complete 3D object models using next best view manipulation plannin, 2011, IEEE, p. 5031-5037 (Year: 2011).*

(Continued)

*Primary Examiner* — McDieunel Marc
(74) *Attorney, Agent, or Firm* — Volpe Koenig

(57) ABSTRACT

A system for placing objects on a surface. The system may include a base, a robotic arm coupled, at an end thereof, to the base, an end effector coupled to the other end of the robotic arm. The end effector may be configured for releasably coupling to an object to be placed on the surface. The system may further include one or more sensor units on a sensor frame. The one or more sensor units may be configured for sensing a two-dimensional profile data including at least two two-dimensional profiles together comprising at least three boundary portions of the object to be placed and at least three boundary portions of objects on the surface. At least two of the three boundary portions of the object to be placed may be from substantially non-parallel sides. At least two of the three boundary portions of the objects on the
(Continued)

surface may be from substantially non-parallel sides. The system may further include a processor configured to determine at least three degrees of freedom of the object to be placed with respect to the sensor frame and six degrees of freedom of the sensor frame with respect to the objects on the surface in a three-dimensional space for determining a current pose of the object to be placed with respect to the objects on the surface based on the two-dimensional profile data. Further, the system may be configured to place the object based on differences between the current pose and a desired pose of the object to be placed determined from a model of objects on the surface in the three-dimensional space.

20 Claims, 14 Drawing Sheets

(51) Int. Cl.
    *B25J 5/00*     (2006.01)
    *B25J 9/00*     (2006.01)
    *B25J 11/00*     (2006.01)
    *B25J 13/08*     (2006.01)
    *B25J 15/00*     (2006.01)
    *B25J 15/06*     (2006.01)
    *B25J 19/02*     (2006.01)
    *E04F 21/00*     (2006.01)
    *E04F 21/02*     (2006.01)
    *G01B 11/25*     (2006.01)

(52) U.S. Cl.
    CPC ......... *B25J 11/0055* (2013.01); *B25J 13/085* (2013.01); *B25J 13/086* (2013.01); *B25J 15/0019* (2013.01); *B25J 15/0616* (2013.01); *B25J 19/021* (2013.01); *B25J 19/023* (2013.01); *E04F 21/0076* (2013.01); *E04F 21/023* (2013.01); *G01B 11/2513* (2013.01)

(58) Field of Classification Search
    CPC ...... B25J 5/007; B25J 15/0019; B25J 9/0087; B25J 9/163; B25J 11/0055; B25J 15/0616; B25J 13/085; B25J 19/021; B25J 13/086; G01B 11/2513; G01B 11/25
See application file for complete search history.

(56) References Cited

U.S. PATENT DOCUMENTS

| | | |
|---|---|---|
| 8,166,727 B2 | 5/2012 | Pivac |
| 8,892,244 B1 | 11/2014 | Taylor |
| 8,965,571 B2 | 2/2015 | Peters |
| 9,074,381 B1 | 7/2015 | Drew |
| 9,358,688 B2 | 6/2016 | Drew |
| 2006/0251500 A1 | 11/2006 | DiGiacomo |

FOREIGN PATENT DOCUMENTS

| | | |
|---|---|---|
| CN | 102277955 B | 5/2013 |
| CN | 203769269 U | 8/2014 |
| CN | 104175309 A | 12/2014 |
| CN | 105133824 A | 12/2015 |
| DE | 19821612 A1 | 11/1999 |
| EP | 2157259 A1 | 2/2010 |
| EP | 2907938 A1 | 8/2015 |
| WO | 2007060537 A2 | 5/2007 |
| WO | 2008052529 A1 | 5/2008 |
| WO | 2009044002 A1 | 4/2009 |
| WO | 2012021732 A1 | 2/2012 |
| WO | 2015164449 A1 | 10/2015 |
| WO | 2016066615 A2 | 5/2016 |
| WO | 2017220469 A1 | 12/2017 |

OTHER PUBLICATIONS

Kruse et al., A Sensor-Based Dual-Arm Tele-Robotic System, 2015, IEEE, p. 4-18 (Year: 2015).*
Lei et al., Fast grasping of unknown objects using force balance optimization, 2014, IEEE, p. 2454-2460 (Year: 2014).*
Coley et al., Perception and motion planning for pick-and-place of dynamic objects, 2013, IEEE, p. 816-823 (Year: 2013).*
Jongeneel, et al. "Robotic tiling of rough floors: A design study" Dec. 20, 2010, XP055125288. URL:http://www.mate.tue.nl/mate/pdfs/12170.pdf. [retrieved Jun. 26, 2014].
Helm, et al. "Mobile robotic fabrication on construction sites: DimRob" Oct. 7, 2012. Intelligent Robots and Systems (IROS), 2012 IEEE/RSJ International Conference ON, IEEE pp. 4335-4341.

* cited by examiner

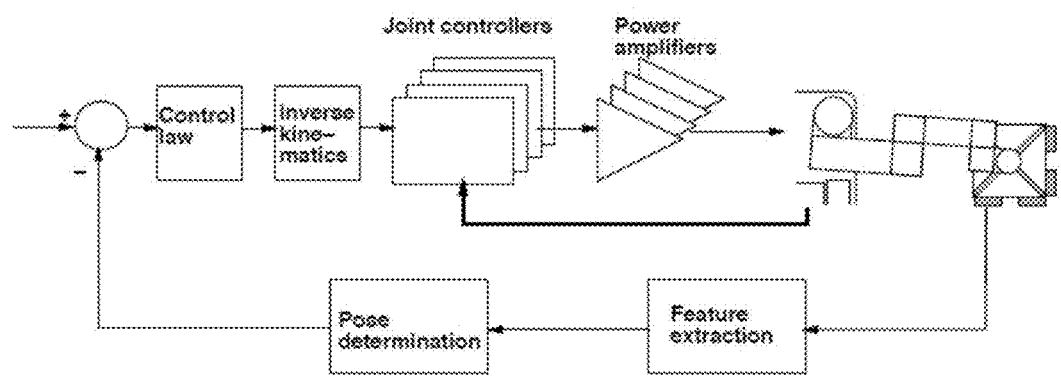
FIG. 8
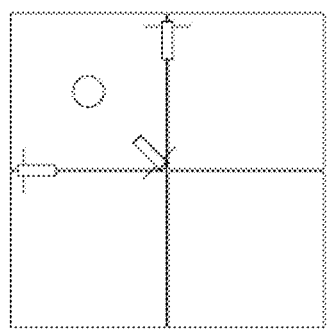 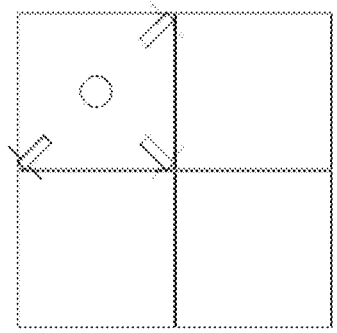
FIG. 9A    FIG. 9B
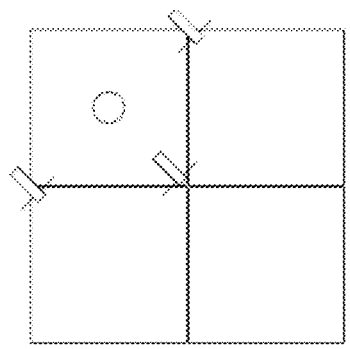 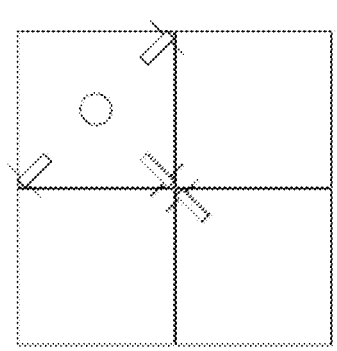
FIG. 9C    FIG. 9D

Tiling defect

Deviation of neighbouring tiles towards tiling grid.

Deflection of a row of tiles towards tiling grid.

Deflection of joint width over a length of 2m.

Lippage between two neighbouring tiles.

Evenness of surface.

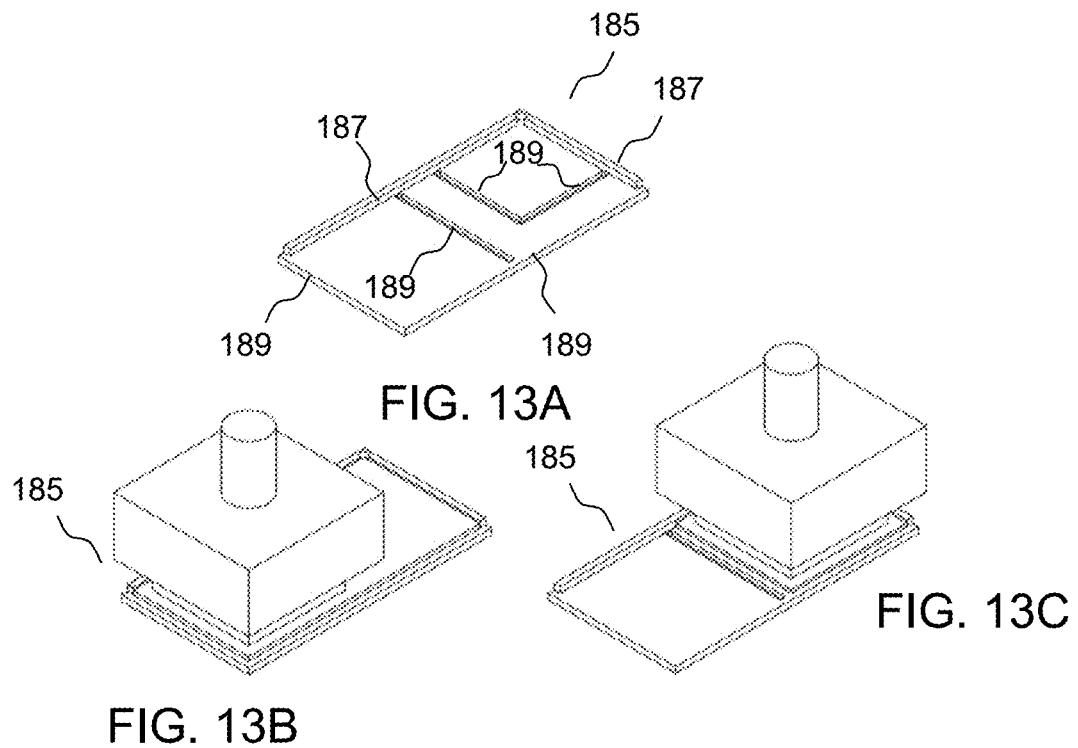
FIG. 13A
FIG. 13B
FIG. 13C
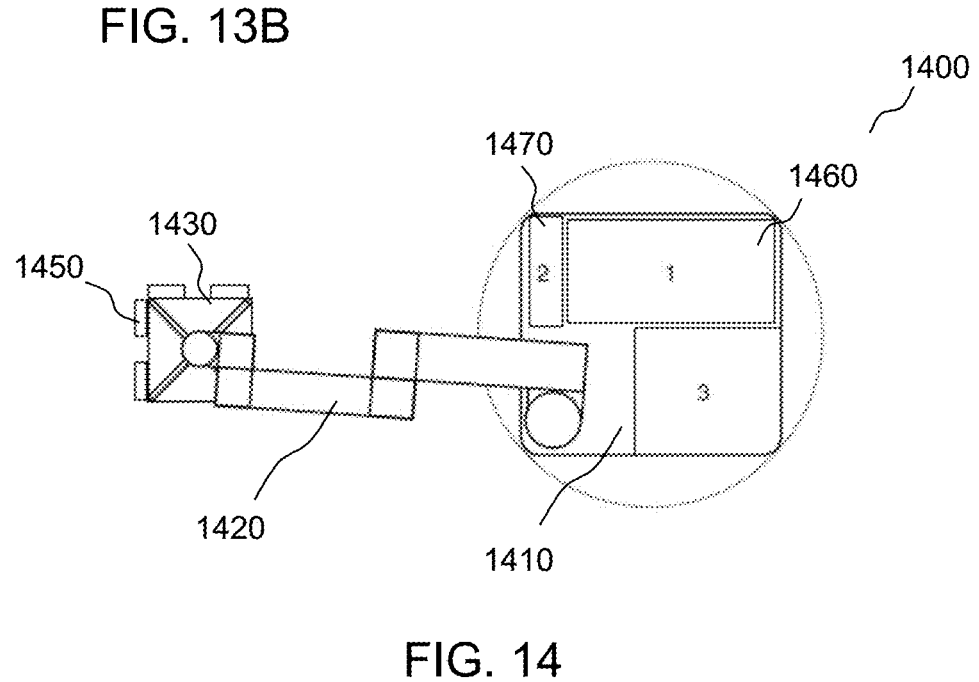
FIG. 14

SYSTEM FOR PLACING OBJECTS ON A SURFACE AND METHOD THEREOF

CROSS-REFERENCE TO RELATED APPLICATIONS

The present application is a National Stage Entry of International Patent Application No. PCT/SG2017/050495 filed on Oct. 2, 2017 and claims the benefit of the Singapore patent application No. 10201608187P filed on 30 Sep. 2016, the entire contents of which are incorporated herein by reference for all purposes.

TECHNICAL FIELD

Embodiments generally relate to a system for placing objects on a surface and a method thereof. In particular, embodiments relate to an automated system/apparatus for placing a plurality of objects in a pre-determined arrangement on a surface and a method of placing a plurality of objects in a pre-determined arrangement on a surface.

BACKGROUND

On-site construction robotics has been constantly discussed and anticipated by both academia and industry. Multiple attempts have been made with limited success in addressing the complexity and problems of a building site, especially when it is a highly unstructured site.

For example, processes of placing surface finishing elements and, in particular, the process of laying tiles has seen several attempts at automation. However, until this present day, there is still no working process that is available in the market.

The majority of these attempts were research projects that have remained at a conceptual stage like the TILEBOT and the SHAMIR projects. Both approaches use large and heavy machinery and are thus targeted towards floor tiling of only large surfaces, such as in retail stores, and are unable to operate in narrow, confined spaces such as in a typical residential floor plan. Further, this machinery may also require new safety and security measures that are uncommon for construction sites.

On the other hand, U.S. Pat. No. 9,358,688 describes a machine for aligning items having three edge sensors for detecting an edge aligned along an X-X edge of the first laid item and an edge aligned along a Y-Y edge of the second laid item so as to position the new item relative to the X-X edge and the Y-Y edge of the first and second laid items by a set distance away from the respective X-X edge and the Y-Y edge. However, the machine of U.S. Pat. No. 9,358,688 is merely for localised placement of items with consideration of immediate neighboring laid items without taking into account of a global view of the overall area.

SUMMARY

According to various embodiments, there is provided there is provided a system for placing objects on a surface. The system may include a base, a robotic arm coupled, at an end thereof, to the base, an end effector coupled to the other end of the robotic arm. The end effector may be configured for releaseably coupling to an object to be placed on the surface. The system may further include one or more sensor units on a sensor frame. The one or more sensor units may be configured for sensing a two-dimensional profile data including at least two two-dimensional profiles together comprising at least three boundary portions of the object to be placed and at least three boundary portions of objects on the surface. At least two of the three boundary portions of the object to be placed may be from substantially non-parallel sides. At least two of the three boundary portions of the objects on the surface may be from substantially non-parallel sides. The system may further include a processor configured to determine at least three degrees of freedom of the object to be placed with respect to the sensor frame and six degrees of freedom of the sensor frame with respect to the objects on the surface in a three-dimensional space for determining a current pose of the object to be placed with respect to the objects on the surface based on the two-dimensional profile data. Further, the system may be configured to place the object based on differences between the current pose and a desired pose of the object to be placed determined from a model of objects on the surface in the three-dimensional space.

According to various embodiments, there is provided a method for placing objects on a surface. The method may include providing a system. The system may include a base, a robotic arm coupled, at an end thereof, to the base, an end effector coupled to the other end of the robotic arm. The end effector may be configured for releaseably coupling to an object to be placed on the surface. The system may further include one or more sensor units on a sensor frame. The one or more sensor units may be configured for sensing a two-dimensional profile data including at least two two-dimensional profiles together comprising at least three boundary portions of the object to be placed and at least three boundary portions of objects on the surface. At least two of the three boundary portions of the object to be placed may be from substantially non-parallel sides. At least two of the three boundary portions of the objects on the surface may be from substantially non-parallel sides. The system may further include a processor configured to determine at least three degrees of freedom of the object to be placed with respect to the sensor frame and six degrees of freedom of the sensor frame with respect to the objects on the surface in a three-dimensional space for determining a current pose of the object to be placed with respect to the objects on the surface based on the two-dimensional profile data. The method may further include placing, using the system, the object based on differences between the current pose and a desired pose of the object to be placed determined from a model of objects on the surface in the three-dimensional space.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 8 shows a control diagram of an example of "eye-in-hand" sensing according to various embodiments;

FIG. 9A shows the basic concept with three sensors according to various embodiments;

FIG. 9B shows the basic concept including dimensions with three sensors according to various embodiments;

FIG. 9C shows the augmented concept with three sensors according to various embodiments;

FIG. 9D shows the augmented concept including dimensions with four sensors according to various embodiments;

FIG. 13A shows a structure for measuring dimensions of a tile according to various embodiments. FIG. 13B shows a rectangular tile being measured. FIG. 13C shows a square tile being measured.

FIG. 14 shows a schematic top view of a system for placing objects on a surface according to various embodiments;

DETAILED DESCRIPTION

Embodiments described below in context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments of a system or an apparatus or a method for placing objects on a surface have been provided to address at least some of the issues identified earlier.

Various embodiments have been provided to address problems in a sub-domain of construction. Various embodiments have provided an apparatus or a system or a method that is capable of automatically placing objects in an arrangement on a surface (e.g. a planar surface), particularly, automatic laying of tiles on a floor on-site, and its usage. According to various embodiments the apparatus or the system may be placed on-site. The planar surface in here may be referring to a flat surface that could be horizontal, inclined or vertical, for example a floor, a wall, or a ceiling. The planar surface may be a pre-fabricated floor, wall, ceiling in prefabricated prefinished volumetric construction (PPVC) or a prefabricated bathroom unit (PBU) which may be built off-site. The planar surface may also be a work bench, a counter top, a desk top, a pedestal, a work table or any suitable support surface.

In one embodiment, an automated apparatus or system is provided. The automated apparatus or system may be utilized to place objects in a particular arrangement to cover a planar surface. The object may be an architectural object or non-architectural object. In one exemplary embodiment, the architectural object may be a tile made using ceramic, porcelain, natural stone such as granite or marble, polymers, glass or natural and/or processed wood such as timber. In another exemplary embodiment, the architectural object may be panels. In one exemplary embodiment, the non-architectural object may be solar panels, or other electronic or electrical components.

Figure 1:
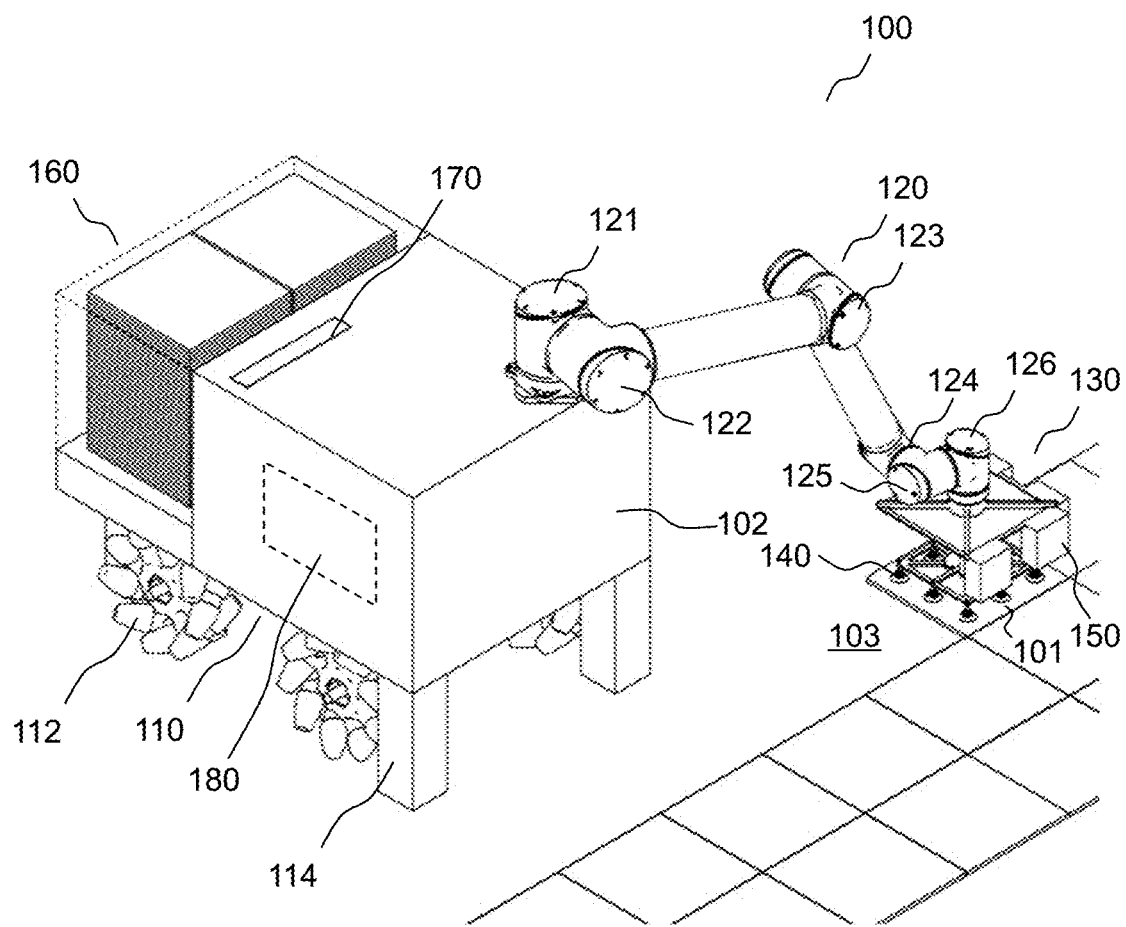
FIG. 1 shows a schematic diagram of a system for placing objects on a surface according to various embodiments.

FIG. 1 shows a schematic diagram of a system (or an apparatus) 100 for placing objects on a surface according to various embodiments. In one embodiment, the system 100 may include an actuated mobile platform 110, a robotic arm 120 (or manipulator or articulated robot), an end effector 130, one or more suction cups 140, or one or more sensor units 150, an air-compressor, a vacuum ejector, an object storage apparatus 160, a bonding material application apparatus 170, and/or a control mechanism 180.

In one embodiment, the system 100 may be able to fit through the doors of residential/housing units on-site (90-80 cm) and may be able to work and manoeuvre in narrow spaces such as corridors (120-110 cm). Therefore, dimensions of the system 100 may not exceed 70 centimetres (cm) in width and 90 cm in length, while a maximum height of the system 100 with the various components retracted does not exceed 180 cm. The dimensions of the system 100 may further not exceed a length that would not allow its footprint to fit inside a circle of 100 cm diameter, for the system to be able to rotate in aforementioned corridors. Further, the weight and size of the system 100 may be configured such that it can operate in small rooms. Accordingly, the system 100 may be able to be fit in residential units.

Figure 2A:
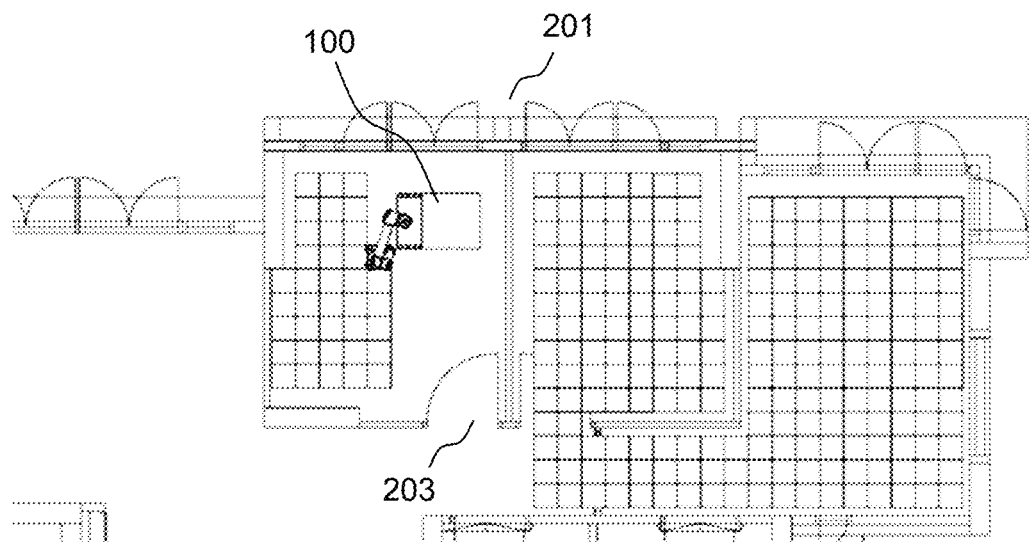
FIG. 2A and FIG. 2B show an example of the mobile object placement strategy.
Figure 2B:
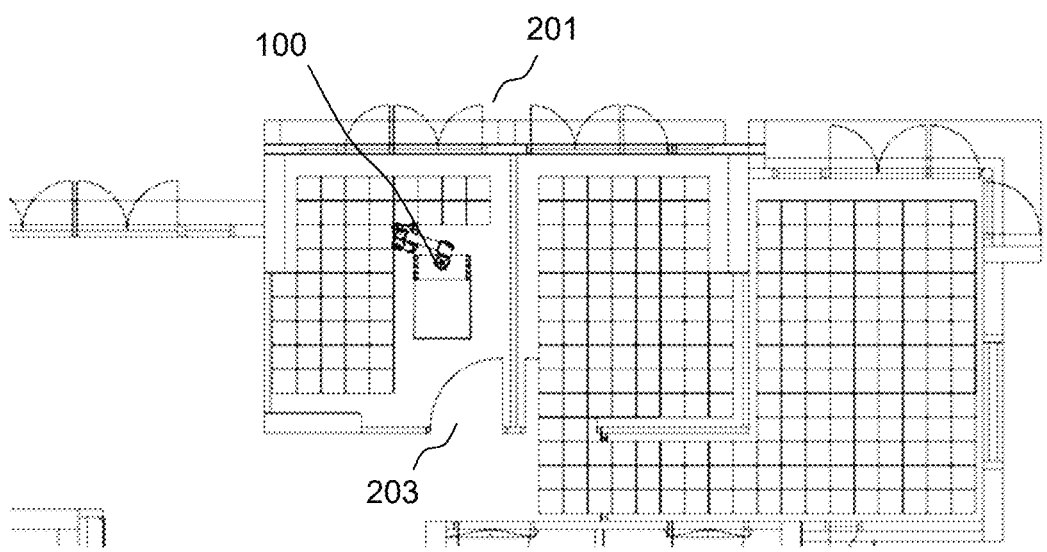

In one embodiment, a mobile object placement strategy is developed to correspond or tailor to the size of the system 100. FIG. 2A and FIG. 2B show an example of the mobile object placement strategy. As shown, the system 100 may cover the whole room 201 by advancing to the next position after placing a patch of objects in each position until only the area expanding from the door opening to the opposite wall of the room is left uncovered. Subsequently, the system 100 then makes a 90 degree turn and continues placing objects and advancing backwards until the system 100 leaves the room through the door opening 203. Here, "patch" refers to a subassembly of objects within the reach of the robotic arm 120 of the system 100 in the current position of the base 110 of the system 100. This placement strategy and dimensioning of the system enables the whole system 100 to work avoiding standing on covered surfaces. A body 102 of the system 100 may include a light and stable frame which can be lifted using a pallet jack or custom transportation apparatus if necessary under special circumstances on the construction site. The custom transportation apparatus may be similar to a pallet jack and may be a customised structure configured for forks to slide in on the side or the other suitable portions of the customised structure.

Figure 10:
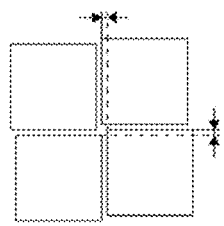
FIG. 10 shows example of common tiling defects.
Figure 10:
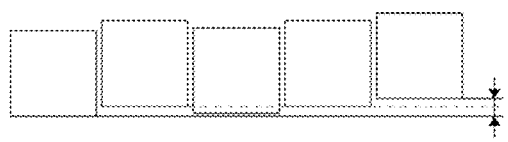
Figure 10:
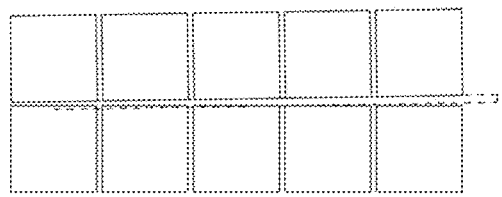
Figure 10:
Figure 10:
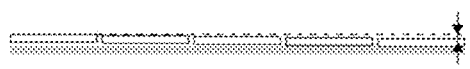

According to various embodiments, the placement method of an object may be based on one or more sides of the object (e.g., side surfaces of an object geometrically extruded from a polygonal outline consisting of straight segments and/or the upper surface defined by such outline). The placement of the object may occur once the object is aligned substantially in parallel to one or more sides and the upper surface of an already-placed object, and simultaneously within a close proximity to the already-placed object. In one embodiment, the placement may reach sub-millimetre (sub-mm) accuracy. For example, with an accuracy (gap size) of down to 0.3-0.2 mm. In one embodiment, the system 100 enables previously unattainable/unprecedented and/or surprisingly level of accuracy. Further, the system 100 may also be configured to address common tiling defects as shown in FIG. 10.

According to various embodiments, the one or more sensor units 150 may be configured to measure/sample/acquire parts of cross-sections of relevant objects, wherein one or multiple such cross-sections may be represented in a profile. These cross-sections may also be referred to as side portions or edge portions or boundary portions of objects. The parts of the cross-sections of relevant objects may include a portion of a top surface of the object to be placed extending inwards from an edge of the object to be placed. The parts of the cross-sections of relevant objects may also include a portion of a top surface of the object on the surface extending inwards from an edge of the object on the surface. Further, the one or more sensor units 150 may be configured to measure one or multiple such profile in its respective sensing planes. Accordingly, the one or more sensor units 150 may be configured to sense a two-dimensional profile of relevant objects. Hence, the sensor unit may include an integrated profile sensor or a custom profile sensor. The integrated profile sensor may typically measure a single profile. The custom profile sensor may measure one or multiple profiles (all by means of triangulation) and typically comprises multiple discrete components (e.g. an imaging device and light emitting devices).

The actuated mobile platform 110 may also be referred to as a base or mobile base. The actuated mobile platform 110 may be able to move independently along an X-axis and a Y-axis with respect to the planar surface (i.e., having a zero non-holonomic kinematic constraints for movement in an XY plane). Furthermore, the actuated mobile platform 110 may also rotate around a Z-axis in a translation-free manner, whereby the Z-axis is a normal to the planar surface.

According to various embodiments, the actuated mobile platform 110 may be configured to be movable by including wheels 112 or legs or wheeled legs, wherein there may be at least one drive wheel or at least one actuated leg. For example, the wheels 112 may include spherical wheels, or Swedish or mecanum wheels, or castor wheels. The legs may include multiple articulated legs. The wheels 112 may be steered wheels such as omni drives, actuated castor wheels, powered steered caster wheels, steered motor-in-wheel-drives, swerve and steer modules or pivot drives. The wheels may be suspended in a non-rigid fashion (in particular if more than three wheels). Accordingly, the base 110 may be able to drive/walk and navigate between the locations. At each location, the base 110 may be rendered stationary.

According to various embodiments, the acutated mobile platform 110 may also include a gantry structure.

In one embodiment, the actuated mobile platform may be capable of moving along the surface on which the objects may be placed by coupling multiple cables to the mobile platform so as to suspend the mobile platform above the surface, similar to a cable-driven parallel robot. The multiple cables may be spanning from the platform to respective support members erected around the perimeter of the surface. The multiple cables may then be adjustably extended and retracted in a coordinated fashion to maneuver or move the platform across various locations above the surface. The actuated mobile platform with the cable mechanism may be assembled for a larger room from easily portable components. Accordingly, the actuated mobile platform may be without wheels or legs. When the objects to be placed are tiles, after the placement of the tiles, the gaps between the tiles could also be grouted, before the bonding material has fully cured or set and it is possible to walk on the tiled surface. The materials (e.g. tiles) may likely be stored off-platform. In this embodiment, the pose (i.e. position and orientation in three dimensional space) of the platform is always known (from the controlled lengths of the cables, with limited accuracy, which may be better than in the case of wheeled locomotion where based on odometry). Further, as the platform is suspended by cables in a not entirely rigid fashion, when the manipulator mounted on the platform is placing an object on the surface, a reaction force may act on the manipulator and be transferred to the platform causing a resultant movement on the platform. Accordingly, the system in this embodiment may require a highly dynamic manipulator to compensate for the resultant movement on the platform.

Referring back to FIG. 1, the actuated mobile platform 110 according to various embodiments may also include three or more electrically actuated feet 114 that can be extended onto the floor (as shown in FIG. 1), thereby lifting the wheels 112 off the ground, supporting the entire weight of the system 100 and rendering the system 100 stationary. In one embodiment, a hydraulic-based system may be used to extend the feet 114 onto the floor, thereby lifting the wheels 112 off the ground and rendering the actuated mobile platform 110 stationary.

In an alternative embodiment, the actuated mobile platform 110 may include three or more rigid feet 114 to support the entire weight of the system 100. The wheels 112 may then be retracted into the platform 110, either electrically or hydraulically, and thus rendering the platform 110 stationary when the platform 110 is resting with the feet 114 on the ground.

According to various embodiments, the actuated mobile platform 110 may further include a scissor lift or similar mechanism that may allow extension of the reach of the manipulator 120, e.g. to reach higher parts of a wall. Accordingly, the scissor lift may be coupled to the base joint of the robotic arm 120 so as to move the robotic arm along a Z axis (at a scale of beyond a few cm) away from the actuated mobile platform 110. Further, the platform 110 may include one, two or more two-dimensional or three-dimensional light detection and ranging (LiDAR) sensors mounted on the base 110 (e.g. two sensors on opposite corners) for obstacle avoidance, workspace and safety monitoring and possibly localization. The base 110 may also include an array of ultrasonic distance sensors around the perimeter of the platform 110 for obstacle avoidance or workspace monitoring. Furthermore, the base 110 may include bumper switches covering the perimeter of the base 110 such that the bumper switches may open on impact with an object. The bumper switch may be configured to trigger safety functions (as a last resort) to halt parts of the system 100. In addition, the base 110 may also include electrical switches configured to be opened when contact with the floor is lost. For example to stop the platform 110 from driving off a step. The electrical switches may be disposed on each side of the base 110.

According to various embodiments, the robotic arm 120 of the system 100 may include multiple joints. In one exemplary embodiment, the robotic arm 120 may include six or more joints (as shown in FIG. 1) that are spaced apart. These joints may be connected through links. The links between these joints may form a kinematic chain. These joints may be referred to as a base joint 121, a shoulder joint 122, an elbow joint 123, a first wrist joint 124, a second wrist joint 125 and a third wrist joint 126. The third wrist joint 126 may also be referred to as an end joint. The base joint 121 may be coupled to the actuated mobile platform 110. The end joint 126 is located farthest away from the base joint 121.

In one embodiment, one or more of these joints 121, 122, 123, 124, 125, 126 within the robotic arm 120 are actuated with linear or rotary hydraulic actuators. These hydraulic actuators may be integrated hydraulic servo actuators. These actuators may be force-controlled. In another embodiment, one or more of these joints 121, 122, 123, 124, 125, 126 within the robotic arm 120 are actuated with electric motors, specifically harmonic drives.

Figure 3A:
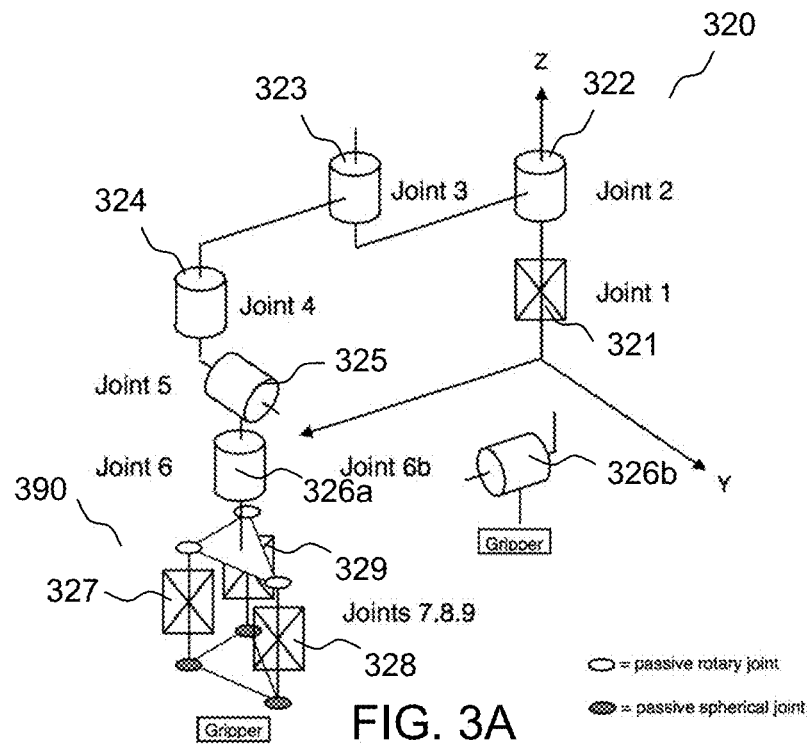
FIG. 3A shows a kinematic diagram of an example of a robotic arm according to various embodiments.

FIG. 3A shows a kinematic diagram of an example of a robotic arm 320 according to various embodiments. The robotic arm 320 may have similar features to a Selective Compliance Assembly Robot Arm (SCARA) type robot. As shown, the robotic arm 320 includes series of three revolute joints 322, 323, 324 all with parallel vertical axis. According to various embodiments, the robotic arm 320 may be inherently rigid in the Z axis so that it can take reaction forces from pressing an object to be placed down (e.g. robust bearings may take the load rather than the drives). According to various embodiments, the robotic arm 320 may have limited workspace in the Z axis. Accordingly, in order for placement of objects (e.g. tiles) higher up on wall, the platform 110 may need to integrate scissor lift for adjusting the height of the robotic arm 320. According to one embodiment, the basis of the robotic arm 320 may include a first set of 5 degree of freedom (DOF) serial kinematic with prismatic and revolute joints. Accordingly, the robotic arm 320 may include a first prismatic joint 321 (i.e. joint 1) for large Z movements. The robotic arm 320 may further include the three revolute joints 322, 323, 324 (i.e. joint 2, joint 3, joint 4) for X/Y/yaw movements. According to one other embodiment, the robotic arm 320 may be configured to include a first set of 6 DOF by having an additional prismatic joint before the last revolute joint 324 for small Z movements (not depicted in the diagram). Further, the robotic arm 320 may be configured to have further DOF. In one embodiment, the further DOF includes a second set of 5 DOF serial and parallel kinematic with prismatic and revolute joints. Accordingly, the robotic arm 320 may further include two serial revolute joints 325, 326*a* (i.e. joint 5 and joint 6) for alignment of the end effector 330 to a vertical surface. The robotic arm 320 may also include a composite joint 390 with a 3 DOF parallel kinematic. The composite joint may include three parallel prismatic joints 327, 328, 329 (i.e. joint 7, joint 8, joint 9) for roll/pitch/(z) adjustment. According to various embodiments the two serial revolute joints 325, 326*a* (i.e. joint 5 and joint 6) may not be needed for floor placement. According to various embodiments, when performing vertical placement of the object, the revolute joint 325 (joint 5) may be locked so that the motor does not need to supply constant torque because the composite joint 390 may be used for fine adjustment. In one other embodiment, the further DOF includes a second set of 2 DOF serial kinematic with revolute joints. Accordingly, the robotic arm 320 may include revolute joint 325 (i.e. joint 5) and revolute joint 326*b* (i.e. joint 6*b*) for roll/pitch adjustment (for floor placement only). For wall placement, this embodiment must include an additional revolute joint 326*a* (i.e. joint 6).

Figure 3B:
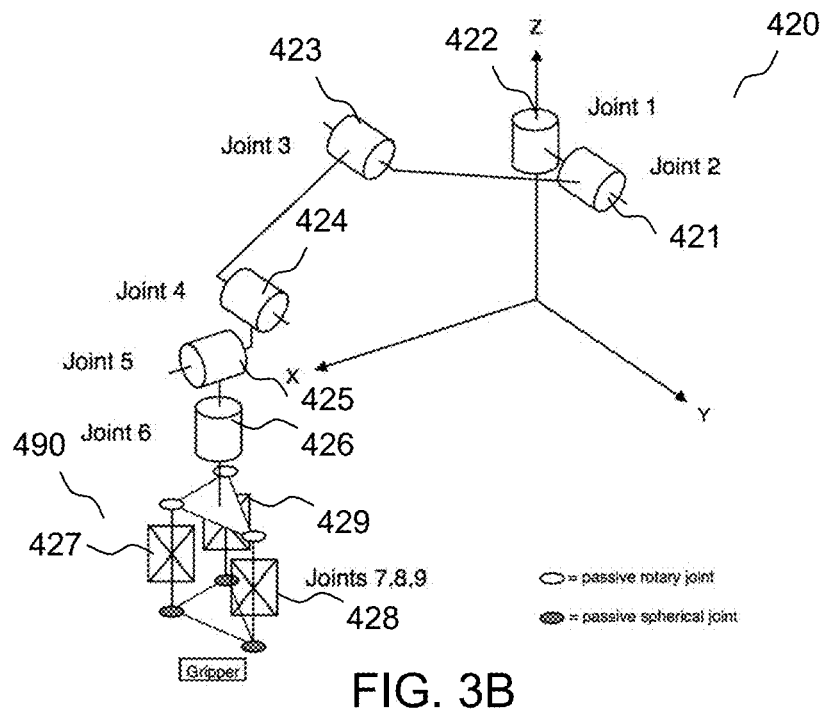
FIG. 3B shows a kinematic diagram of another example of a robotic arm according to various embodiments.

FIG. 3B shows a kinematic diagram of another example of a robotic arm 420 according to various embodiments. The robotic arm 420 may be an articulated robotic arm. As shown, the robotic arm 420 may include a common 6 DOF serial kinematic with revolute joints 421, 422, 423, 424, 425, 426 (i.e. joint 1 to joint 6). According to various embodiments, the robotic arm 420 may be configured to include a 5 DOF serial kinematic with revolute joints attached to a 3 DOF parallel kinematic with prismatic joints. For example, the robotic arm 420 may include revolute joints 421, 422, 423, 424, 426 (i.e. joint 1 to joint 4 and joint 6) and three parallel prismatic joints 427, 428, 429 (i.e. joint 7 to joint 9) without the fifth revolute joint 425 (i.e. joint 5). The three parallel prismatic joints 427, 428, 429 may form a composite joint 490 having 3 DOF. Each of the three parallel prismatic joints 427, 428, 429 may have a passive and non-actuated joint at each end. According to various embodiments, the fifth revolute joint 425 (i.e. joint 5) may still be needed for placement on wall. According to various embodiments, revolute joints 421, 423, 424 (i.e. joint 2 to joint 4) could be motorized with linear hydraulic actuators.

Figure 4:
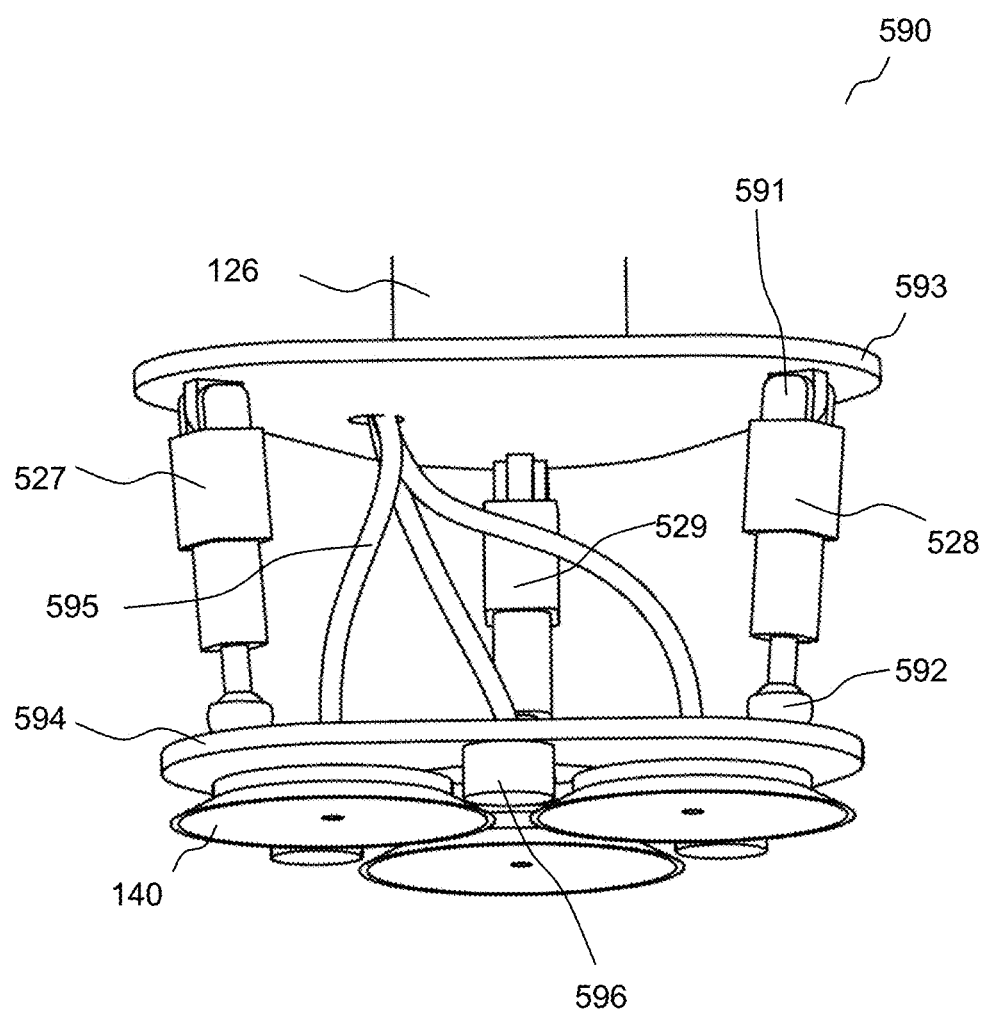
FIG. 4 shows an example of a composite joint according to various embodiments.

FIG. 4 shows an example of a composite joint 590 with a 3 DOF parallel kinematic for roll, pitch and Z axis fine adjustment. The composite joint 590 may be configured to be coupled to an end joint 126 of the robotic arm 120 or may be part of the end joint 126 of the robotic arm 120. Accordingly, the end effector 130 may be coupled to the composite joint 590. Hence, the composite joint 590 may couple the end-effector 130 to the robotic arm 120. In one embodiment, the one or more sensor units 150 may be coupled directly to the end-effector 130. In another embodiment, the one or more sensor units 150 may be coupled to one end of the composite joint 590 and the end-effector 130 may be coupled to another end of the composite joint 590. In such an embodiment, the composite joint 590 may be considered as part of the end-effector 130.

As shown in FIG. 4, the composite joint 590 may include at least three parallel linear actuators 527, 528, 529 (e.g. DC stepper motor captive leadscrew actuator or hydraulic linear servo actuator or electric linear servo actuator). According to various embodiments, the composite joint 590 may be able to apply a high press force (limited by the reaction force the rest of the kinematic is able to handle). In one other embodiment, a composite joint may include at least two linear actuators with a parallel ball joint. In another embodiment, the composite joint 590 may substitute the linear actuators with rotary actuators with levers. In yet another embodiment, the composite joint 590 may also be configured to have Hexapod/Steward platform configuration (six parallel prismatic, joints with the revolute joints replaced with universal joints). As shown in FIG. 4, each of the linear actuators 527, 528, 529 has a revolute joint 591 at the top end and a spherical joint 592 at the bottom end. In another embodiment, the revolute joint 591 may be at the bottom end and the spherical joint 592 may be at the top end. Referring back to FIG. 4, each of the linear actuators 527, 528, 529 may be coupled to a first plate 593 via the revolute joint 591. Each of the linear actuators 527, 528, 529 may also be coupled to a second plate 594 via the spherical joint 592. The one or more suction cups 140 may be coupled to the second plate 594. Each suction cup 140 may be coupled to a vacuum source via a pipe 595. Hence, each pipe 595 may couple one suction cup 140 to the vacuum source. Further, the second plate 594 may include projections 596 or collars (around the suction cups). According to various embodiments, the object 101 may be pulled against the projections 596 or collars by suction cups. The projections 596 may restrict the pose of the object 101 in roll and pitch and Z position. According to various embodiments, the projections or collars may also be included in end effector 130 of other embodiments without parallel kinematic composite joint 590. As shown, the composite joint 590 may be coupled to the end joint 126 or end link of the robotic arm 120. According to various embodiments, a vibrator (e.g. a motor with an unbalanced mass on its driveshaft) may be coupled to the first plate 593. The vibrator may not be coupled to the first plate 593 in a rigid fashion in order to prevent the transmission of vibrations. In one embodiment, an additional linear actuator (e.g. pneumatic or hydraulic or leadscrew actuator etc.) may be configured for releasing/retracting the vibrator independently from end effector movement. In another embodiment, the vibrator may be suspended or hanged on the composite joint 590 without being coupled to any actuator (thereby allowing for certain x/y/z movement, restricted by guides to limit lateral movement to prevent contact with other components). In this embodiment, the vibrator may be lowered onto the objet by retracting the lower plate with the three linear actuators while simultaneously moving the whole composite joint down. According to the various embodiments, vibrations may be decoupled from the end effector 130. According to various embodiments, the vibrator may be lowered and engaged for final z-axis movement of the object 101 and/or after other suction cups have been lifted off. The vibrator may also include a suction cup on the bottom thereof to attach to the object 101. According to various embodiments, the vibrator may also be included in other embodiments of the end effector 130 without the parallel kinematic composite joint 590.

Figure 5B:
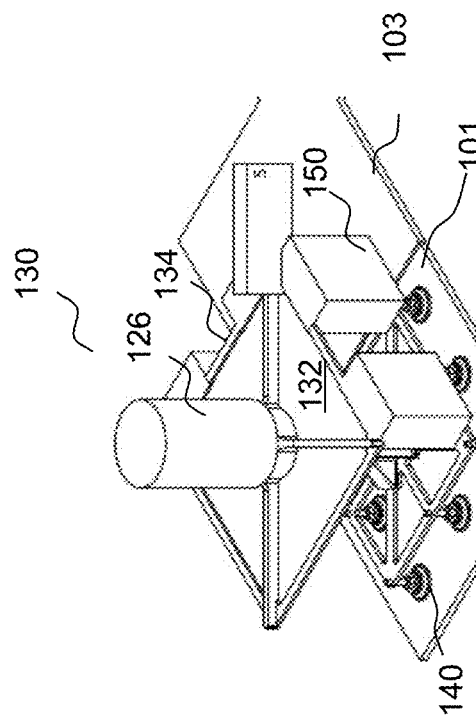
FIG. 5A to FIG. 5C show the end effector of the system according to various embodiments.
Figure 5C:
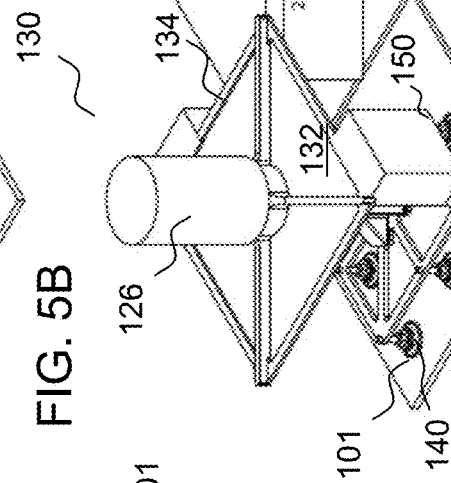
Figure 5A:
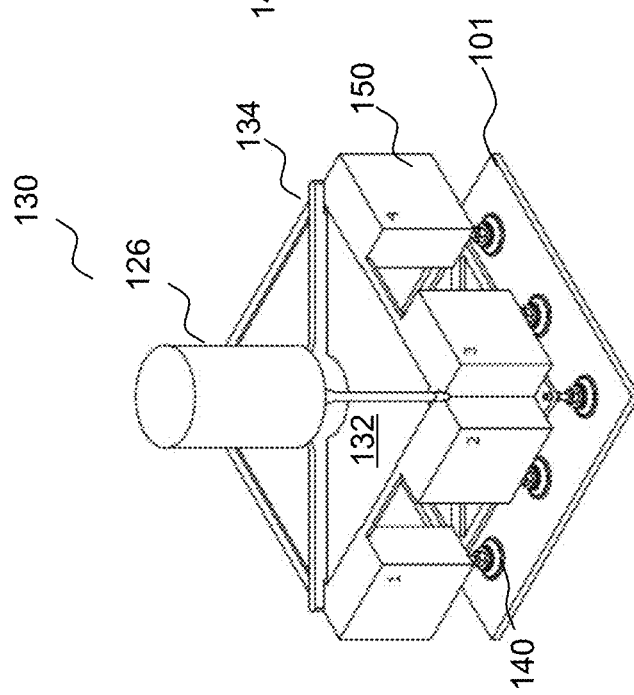

FIG. 5A to FIG. 5C show the end effector 130 of the system 100 according to various embodiments. As shown, one 132 of the surfaces of the end effector 130 may be secured to the end joint 126. In one embodiment, the end effector 130 is detachable from the end joint 126 if needed.

Figures 6C, 6D:
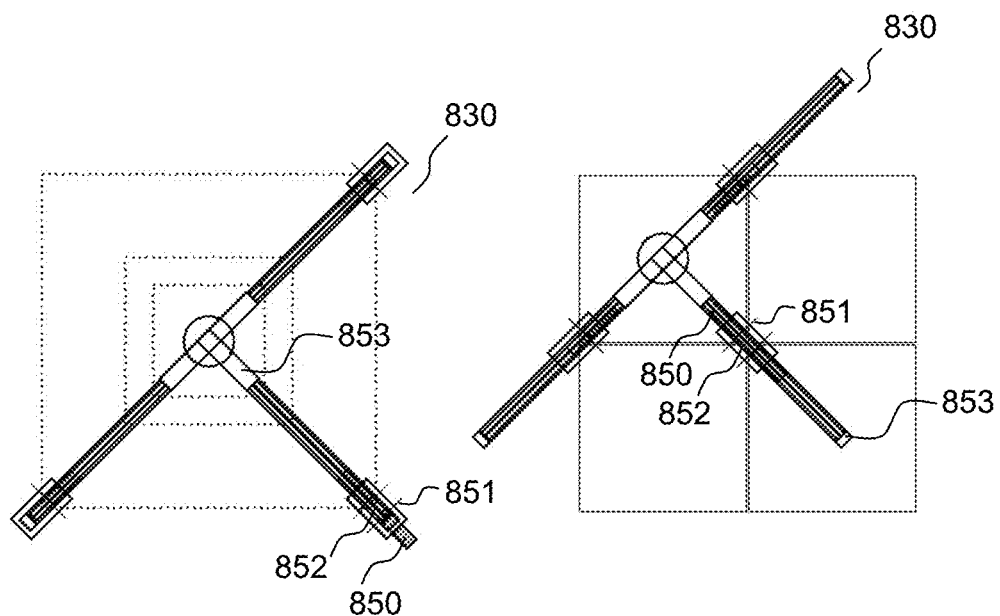
FIG. 6C and FIG. 6D shows an example of a reconfigurable embodiment (of augmented sensing concept including dimensions) of an end effector for square objects.
Figure 6A:
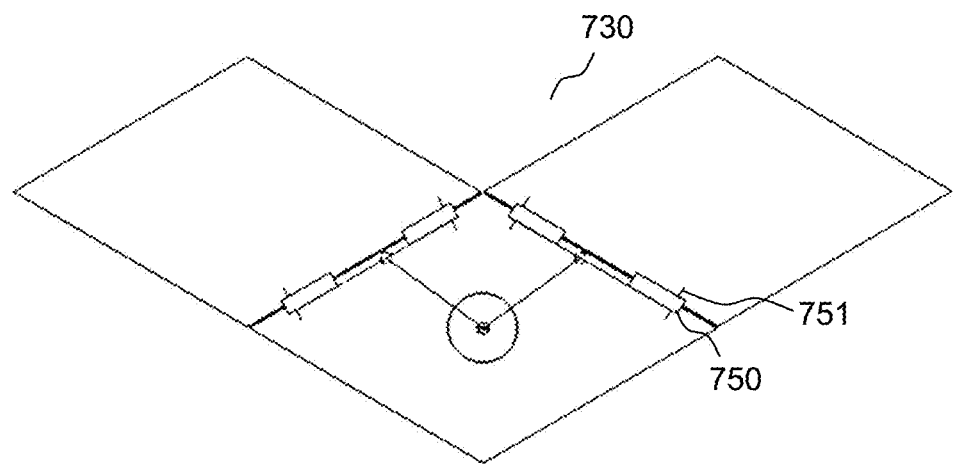
FIG. 6A shows schematically how the sensors (and sensing planes) are arranged for rhombus shaped objects (for reconfigurable embodiment of basic concept)
Figure 6B:
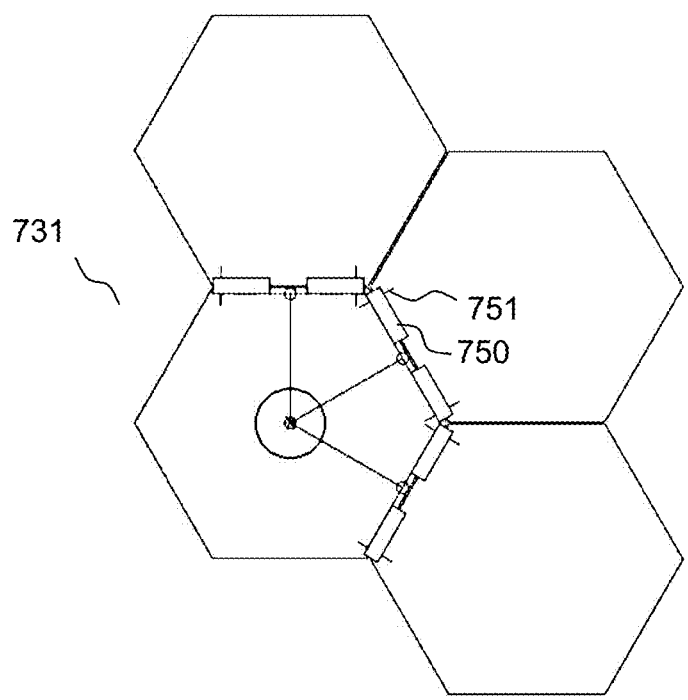
FIG. 6B shows schematically how the sensors (and sensing planes) are arranged for hexagon shaped objects (for reconfigurable embodiment of basic concept)

The other surfaces of the end effector 130 may be coupled to one or more structures 134. These structures 134 may be adjustable or configurable such that some of the side surfaces of the end effector 130 may be approximately aligned in parallel with sides of the gripped object 101 (i.e., an object to be placed). FIG. 6A to FIG. 6B show examples of other configurations of end effector 730, 731 according to various embodiments. As shown, for example, in FIG. 6A to FIG. 6B, the sides of the object-to-be-placed may become approximately perpendicular to a sensing plane 751 of the profile sensors 750 or sensor units mounted on the side surfaces.

FIG. 6A shows an example of another configuration of an end effector 830 according to various embodiments. As shown, a middle line formed between two adjacent sides (with an angle that is approximately between 60 degrees and 120 degrees) of the gripped object may become aligned approximately perpendicularly to the sensing plane 851 of a profile sensor 850 or sensor unit mounted on one of the side surfaces of the end effector.

In one embodiment, and as shown in 5A to FIG. 5C, the suction cups 140 mounted on the lower surfaces may be distributed within the area of the upper surface of the gripped object 101. According to an embodiment, the suction cups 140 may be symmetrically distributed.

According to various embodiments, the end effector 130, 730, 830 may include one or more two dimensional (2D) or three dimensional (3D) LiDAR sensors, an inclinometer (or an inertial measurement unit or an attitude reference system or an attitude heading reference system or an orientation reference system; all later referred to as the latter), a force-torque sensor (typically referred to as F/T sensor, typically providing measurements in 6 axes, in particular of use for placing interlocking objects such as timber or vinyl tiles), a pneumatic valve and a vacuum ejector, a precision rabbet with a calibrated geometry that can be used for measuring dimensions of the current object, features which provide a solid contact surface to the object's upper side to constrain its position in negative z-dimension, as well its orientation in roll and pitch.

Referring back to FIG. 1, the system 100 also includes one or more suction cups 140 mounted on the lower surface of the end effector 130. These suction cups 140 are coupled to a vacuum source. When the vacuum source is switched-on, the suction cups 140 adhere to an upper surface of the object 101 to be placed (such as a tile).

In the embodiment shown in FIG. 5A to FIG. 5C, the structures 134 are spatially separated and may to some degree mechanically isolate the lower surface(s) from the structure(s) 134 connecting the side surfaces. Such arrangement may help to reduce the stress on the structures 134 connecting the side surfaces and may redirect the stress to the end joint 126 of the robotic arm 120. Hence, any deformations (elastic or plastic) that may arise may not affect the sensor poses.

In one embodiment, the vacuum source for the suction cups 140 may be an air compressor in conjunction with a venturi vacuum generator (also known as a vacuum ejector). In an alternative embodiment, the vacuum source may be a vacuum pump or a vacuum blower, especially in the case where the system is optimized to handle objects with very rough surfaces.

Furthermore, the connections of the suction cups 140 to a vacuum source are switchable individually or in groups using mechanical means so as to adapt to different shaped and sized objects. Alternatively, the connections of the suction cups 140 may be switchable using electro-mechanical means and subsequently be actuated and controlled.

As shown in FIG. 5A to FIG. 5C, the system 100 may also include multiple profile sensors 150 or sensor units that are mounted on the side surfaces (in a way so that the surface normal vectors will lie in the respective planes in which the profiles are measured). The sensors 150 are oriented in a way so that the profiles measured are samples of a cross-section of the object to be placed 101 (e.g., at an approximating angle of 90 degrees or 45 degrees with respect to the object's side plane) and at least one object on the surface 103 (with each cross-section covering one or two edges or sides of an object) once the latter be close enough to be within the sensor's field of view. In one embodiment, the system 100 may include three or more profile sensors 150.

It should be appreciated that the profile sensors 150 differ from edge sensors. An edge sensor outputs only a gap size (a one dimensional measurement) or an edge offset from a centre line (a one dimensional measurement) or an edge point. This information would (a) not be suitable to compute a relatively good enough estimate of the pose of an object in the presence of a chamfer or bevel around its upper surface as the obtained point will not lie in the surface plane of the object and therefore, would likely require additional sensors, and (b) not be suitable to compute an estimate of the floor plane or other geometric features.

Figure 5D:
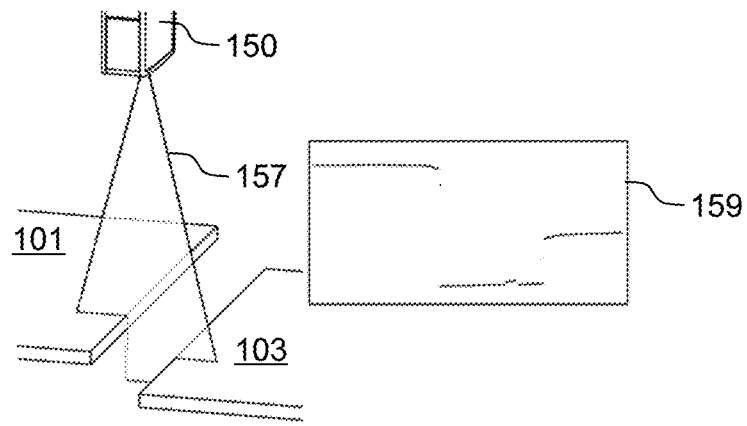
FIG. 5D shows a profile sensor and a two-dimensional profile obtained by the profile sensor according to various embodiments.

The profile sensors 150, as shown in FIG. 5D, on the other hand, provide access to two-dimensional coordinates of points in the measurement plane 157 (which constitute a "profile" 159), with 500 points or more typically, spread over a distance of 25 mm or more, yielding a sampling resolution in that direction of 0.2 mm or higher. FIG. 5D shows the profile sensor 150 and the two-dimensional profile 159 obtained by the profile sensor according to various embodiments.

A profile may be then be analysed by a custom algorithm implemented through a software program (i.e., based on a particular code) running either on an embedded processor within the sensor or on a processor within a control computer.

The analysis may include steps of fitting lines or more complex geometric shapes to a subset of profile points, projecting selected points onto such shapes etc. In one embodiment, the results may be referred to as profile features.

A combination of such profile features from multiple profile sensors 150 may be transformed to a common 3D coordinate system. These profile features are then used to compute more abstract properties of the object 101 and potentially other entities (e.g., objects previously placed 103 on the planar surface, physical references, of the planar surface itself). This enables computing up to 6 degrees of freedom (DOF) of their pose or some of their dimensions.

In one embodiment, measurements obtained from two profile sensors 150 are needed to align a side of the object 101 (measuring in planes either approximately perpendicular or at a 45 degrees angle to the respective side, spaced apart at the largest feasible distance) with a side of a previously placed object 103 in 3D space, in order to estimate a high enough number of the degrees of freedom of the previously placed object 103 (e.g., to estimate the orientation of its top surface, or the yaw component of its pose, which is not fully possible with single sensor).

The measurements from the profile sensors 150 are synchronously taken from a single pose of the end effector 130 (no "multiple views" are required) and combined to compute the currently to be placed object 101 or previously placed object 103 properties, in order to be used for closed-loop control of the end effector 130. In one embodiment, the measurements are taken at a rate of at least 30 hertz (Hz). In addition, using only measurements from a single pose ensures that the object properties are free of errors introduced by inaccuracies in the transformations between subsequent poses of the end-effector 130.

The end effector 130 may be configured in a way so that each side of the current object 101 that is to be aligned to at least one side of a previously placed object 103 is perceived by at least two profile sensors 150. For a non-rectangular outline such as from a triangular, rhombic or hexagonal shaped object as shown in FIG. 6A and FIG. 6B, more than two profile sensors 750 may be needed (if more than one side is to be aligned).

In one embodiment, a hexagonal shaped outline may require at least three profile sensors 750 (if three sides are to be considered for determining the goal pose), wherein there is one profile sensor on each side.

According to various embodiments, feasible configurations of the sensing concept may include the following.

The feasible configuration may include a basic sensing concept. The basic sensing concept may involve continuously measuring the full 6 DOF (or 3 DOF if z/pitch/roll are mechanically restricted) of the currently gripped object 101 and 6 DOF of previously placed objects 103 as shown in the examples of FIG. 5A, FIG. 6A and FIG. 6B. For example, it may be sufficient to measure 5 DOF of a first object on the surface and just 1 DOF of a second object on the surface if information from a model according to various embodiments is used in addition. FIG. 5A shows a non-reconfigurable (fixed) embodiment of the basic concept with 4 sensors (for rectangular objects of limited specific sizes, e.g. 300×300 mm, 300×600 mm). FIG. 6A shows schematically how the sensors (and sensing planes) are arranged for rhombus shaped objects (for reconfigurable embodiment of basic concept). FIG. 6B shows how the sensors (and sensing planes) are arranged for hexagon shaped objects (for reconfigurable embodiment of basic concept). FIG. 9A shows the basic concept with 3 sensors.

The feasible configuration may also include an augmented sensing concept. The augmented sensing concept may involve measuring an additional DOF for previously placed adjacent objects 103 (thus reaching full 6 DOF) by sampling an additional side of these objects that is adjacent to the side the current object 101 is to be aligned to. This may reduce reliance on estimated properties from the model and increase placement precision. However, this may in return increase the size of the end-effector as shown in the examples of FIG. 5B and FIG. 5C. FIG. 5B shows a non-reconfigurable (fixed) embodiment of the augmented concept with 5 sensors (for rectangular objects of limited specific sizes, e.g. 300×300 mm, 300×600 mm). FIG. 5C shows a non-reconfigurable (fixed) embodiment of the augmented concept with 4 sensors (for rectangular objects of limited specific sizes, e.g. 300×300 mm, 300×600 mm). FIG. 9C shows the augmented concept with 3 sensors.

The feasible configuration may also include a basic/augmented sensing concept including dimensions. The basic/augmented sensing concept including dimensions may involve additionally allowing measuring of one or more dimensions of the current, gripped object by sampling an additional side of it which is opposite to a side that is to be aligned, without requiring an auxiliary apparatus. FIG. 6C and FIG. 6D show a reconfigurable embodiment of the augmented concept including dimensions with four sensors. FIG. 9B shows the basic concept including dimensions with 3 sensors. FIG. 9D shows the augmented concept including dimensions with 4 sensors.

Profile sensor 150, 750, 850 or the sensor unit as described herein may include an integrated profile sensor or a custom (or discrete) profile sensor. An "integrated" profile sensor typically integrates image sensor (typically complementary-metal-oxide-semiconductor: CMOS or charge-coupled-device: CCD), lens, light source (typically laser diode), pattern generator (typically diffractive optical element to generate line) and processing unit (typically field programmable gate array: FPGA) into a single enclosure that is configured for use in industrial automation. The integrated profile sensor is typically factory-calibrated (e.g. intrinsic parameters of lens, pose of laser plane with respect to sensor etc.) and is able to provide metric 2D measurement points from the sensing plane (by means of triangulation) or derived, more abstract features with sub-mm resolution and at rates higher than 100 Hz. The integrated profile sensor typically only measures in a single plane (so there is usually one laser line projected onto the object surfaces).

According to various embodiments, the integrated profile sensor may be coupled to the end effector 130 in a non-reconfigurable configuration. Accordingly, the integrated profile sensor may be coupled to the fixed structure 134 as shown in FIG. 5A to FIG. 5C. Accordingly, the end effector 130 may have little flexibility for accommodating objects of different sizes.

According to various embodiments, as shown in FIG. 6C and FIG. 6D, the integrated profile sensor may be coupled to the end effector 830 in a reconfigurable configuration. For example, the structure to which the integrated profile sensors are attached to may be reconfigurable for square objects using prismatic joints. E.g. for 20×20 to 60×60 cm objects. Accordingly, the integrated profile sensors 850 may be mounted on extendible arms (e.g. comprising a telescopic rail, a leadscrew and a stepper motor) or the carriage 852 of a linear axis 853 (e.g. stepper motor actuated). Each arm may have 1 DOF and may not rotate. This may allow precise re-positioning of the sensors, e.g. realizing the sensing concept of FIG. 9D with 3 arms arranged at 90 degree angles. In another example, the structure to which the integrated profile sensors are attached to may be reconfigurable for rectangular objects using prismatic joints, e.g. for 60×30 cm objects. Similarly, the structure may include extendible arms or linear axes with carriages. Further, the sensor arms can pivot or rotate around the axis of the end joint (i.e. wrist 3) of the manipulator. The extendible arms may be attached to the part of the end effector coupled to the manipulator end joint via rotary actuator. According to another embodiment, pairs of arms may be connected via extending linear actuators. Accordingly, the two arms forming the ends of the chain need to be "grounded" to the end joint (i.e. wrist 3) via actuators (so 7 linear actuators may be required for 3 arms) to prevent rotation of the whole chain around the end joint axis. According to various embodiments, another rotary actuator at the end of the arm may be needed to set the optimal angle of the sensing plane for non-square objects. In a further example, the structures to which the integrated profile sensors are attached to may be reconfigurable using revolute joints, e.g. resulting in a 3 DOF serial kinematic (as in an articulated robot) for each sensor. Joint 1 may share axis with end joint (i.e. wrist 3) of the manipulator. The gripper structure underneath may be connected via thru-bore of joint 1 to the structure coupling the end effector to the end joint of the manipulator. Joint 2 and Joint 3 may have parallel offset axis. The sensor assembly on joint 3 can be positioned with 3 DOF in a plane above the object. Measurement of profiles in more than one location (i.e. with multiple 3DOF serial kinematics) may need revolute joints with high encoder resolution and stiff links to determine the resulting sensor poses accurately (for transforming profile data into common frame without introducing significant errors). This example may be more suitable or feasible with single custom profile sensor as described below.

In a "custom" (or "discrete") profile sensor, an imaging device (and usually lens) and light projecting component(s) are separate components rather than comprising a factory-precalibrated unit. In the custom profile sensor, measurements in multiple planes are possible (e.g. resulting in projections of two lines or a stripe pattern; subject to how the sensor data is processed). The components and their configuration (including the geometry of the setup) can also be carefully chosen in order to achieve the targeted measurement characteristics. According to various embodiments all parts of the custom profile sensor may be calibrated in an elaborate procedure in order to approach the maximum theoretical measurement performance. Further, the calculation of metric profile points in a defined sensor reference frame using the calibrated model is delegated to a processor which integrates the components. The processor may be provided separately. According to various embodiments, such a setup may allow for a larger field of view and greater flexibility over integrated sensors, but substantial effort may be needed to achieve stability and robustness, especially under harsh conditions. In one embodiment, one class of imaging devices which is widely available and outputs full area image data may be used. With a high-resolution sensor and the high measurement rates required for control (at least 20 Hz, ideally 100 Hz or more), this may lead to high data rates to the main processing unit, particularly with multiple sensors. Accordingly, these may push the limits of both the sensor interface (bandwidth) and the computational load the processing unit is able to handle. In another embodiment, another class of imaging devices that is sparsely available at the time of writing may output the results of a preprocessing stage (which are more abstract and much smaller in byte size). Typically, an FPGA deterministically (and at high speeds) executes preprocessing operations on the image data, thus enabling use of the results for real-time application behaviour (such as typically required for a closed-loop or feedback control system). The central preprocessing step would be the extraction of the light pattern projected onto the object (typically laser line(s)) from the image data (e.g. sub-pixel accurate peak detection in each sensor array column). Due to the drastically reduced data size per frame, much higher frame rates can be transmitted than with conventional high-resolution industrial cameras (providing a resolution of 10M pixel or more). The remaining processing steps in obtaining metric data (e.g. undistortion, transformation into sensor reference frame, intersection of rays with laser plane etc.) still need to be executed by the processor which integrates the components. The processor may be provided separately.

Various embodiments of the custom profile sensors seek to provide measurements of cross-sections at sufficient resolution for rectangular objects with sides of 20 cm or more length (such as 20×20, 30×30, 60×30, 50×50 or 60×60 cm).

According to various embodiments, the custom profile sensors may be coupled to the end effector 130 in a non-reconfigurable configuration. For example, the end effector may include one custom profile sensor with a single camera looking "over a corner" of the rectangular object to be placed such that the two adjacent corners are still (or almost) within the field of view of the camera. The angle between the optical axis of the camera and the normal of the object surface may be larger than zero (i.e. the camera is "not straight down" looking). The custom profile sensor may include laser lines projected onto the objects (e.g. as in FIG. 7). The laser lines may be substantially parallel to the x axis of imaging plane of the camera. The angle between y axis of imaging plane of the camera and the normal of the laser plane may be sufficiently large to result in the required z axis resolution (with respect to the object frame). This configuration may be implemented with a suitable imaging sensor and lens with sufficient resolutions.

According to various embodiments, the number of custom profile sensors employed depends on the available camera (and lens) resolution and the (range of) size(s) of objects to be measured.

In another example, the end effector may include two custom profile sensors with two cameras looking "over sides" (2 adjacent sides) of the rectangular object to be placed such that profiles measured near both corners of one side yield sufficient lateral resolution. The camera may be looking straight down in the middle of a side or from a corner at an angle. The laser lines may be projected appropriately (so that the projection angles yield required z resolution etc.), approximately perpendicular to the sides. This configuration may be implemented with a suitable imaging sensor and lens with sufficient resolutions.

Figure 7:
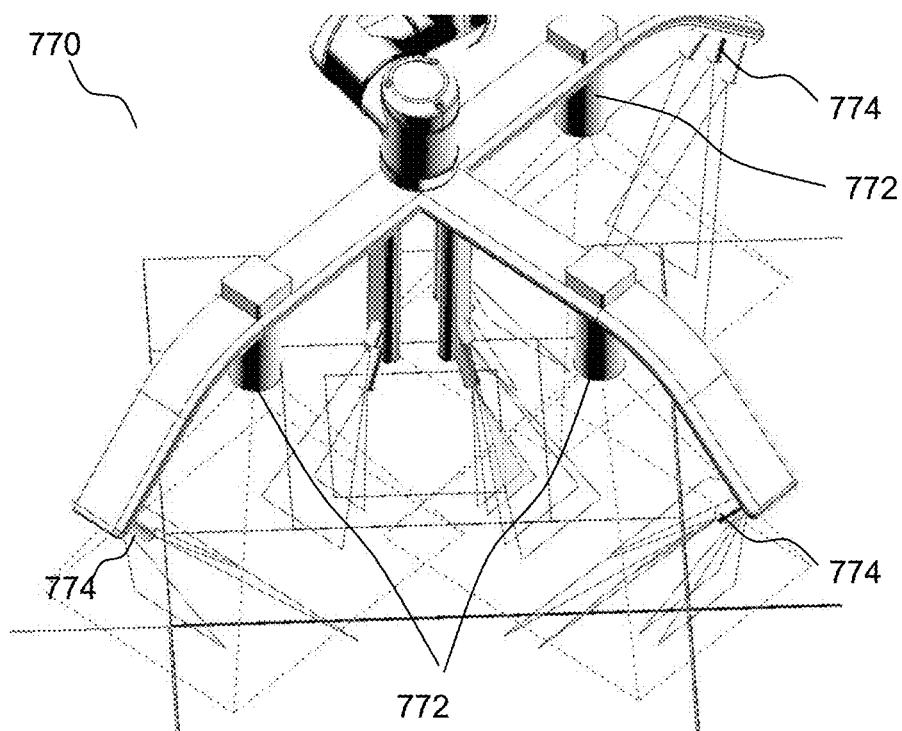
FIG. 7 shows a custom profile sensor configuration with three cameras according to various embodiments.

In yet another example, the end effector may include three custom profile sensors with three cameras looking "over corners" (3 adjacent corners) of the rectangular object to be placed. FIG. 7 shows a custom profile sensor configuration 770 with three cameras 772 according to various embodiments (part of the end effector that couples with the object to be placed not shown). As shown in FIG. 7, according to various embodiments, an augmented sensing concept including dimensions may be implemented with three custom profile sensors. According to various embodiments, the three custom profile sensors may be coupled to a fixed or a non-reconfigurable frame. According to various embodiments, the three custom profile sensors arrangement may be configured for objects of 20×20, 30×30, 60×30 and 60×60 sizes. According to various embodiments, only the appropriate lasers 774 may be switched on for such an object (in FIG. 7 the field of view for all cameras and all laser planes are depicted to show the arrangement for the different sizes). According to various embodiments, for a 60×30 configuration, either the left or right laser projector may be switched on on each arm, depending on the orientation in which the object is coupled. According to various embodiments, the mounting structure may be a light and stiff carbon fibre structure.

In a further example, the end effector may include four or more custom profile sensors with four or more cameras and with appropriate laser patterns projected.

According to various embodiments, the custom profile sensors may be coupled to the end effector 130 in a reconfigurable configuration. The reconfigurable configuration of the custom profile sensors may be similar in principle to that of the integrated profile sensors. However, the larger field of view should allow for smaller reconfiguration ranges. Further, the profiles can be measured under optically favourable geometries (e.g. area of lens with higher resolution used).

According to various embodiments, various sensing strategies may be provided. According to the various embodiments, the sensing strategy may include sensing on the end effector 130 of the manipulator (i.e. "eye-in-hand" sensing), which is the main strategy adopted for the various embodiments as described herein. FIG. 8 shows a control diagram of an example of "eye-in-hand" sensing. In this strategy, the relative pose error of the object to be placed can be obtained in the end effector frame (and used for so called dynamic look-and-move visual servoing).

According to various other embodiments, the sensing strategy may include sensing of the objects from a fixed frame or a moving frame (i.e. eye-to-hand sensing). In one embodiment, sensing may be from a moving link of the manipulator kinematic. However, if sensing is after joint 6 of the robotic arm 420 in FIG. 3B, it is still considered more eye-in-hand.

In another embodiment, sensing may be from the mobile base. To sense the object poses accurately enough from a larger distance and within a wide field of view may require suitable sensing technology. Further, as sensed poses transformed to the end effector frame may be influenced by errors in the model of the manipulator kinematic, the pose of end effector with respect to the base may have to be measured directly without joint data (e.g. by optical means, as using joint data with the model may introduce the errors).

In one other embodiment, sensing may be from a separate sensing kinematic attached to the mobile base. The profile sensors may need to be brought close enough to the area of interest. For example, the base may include a serial kinematic (suitable for floor measurements only) comprised of one horizontal linear axis (prismatic joint) followed by three vertical rotational axes (revolute joints). The pose of the sensor assembly with respect to the end effector may be measured directly as in [0070]. Alternatively, the pose with respect to the mobile base may need to be determined with a motion tracking system (e.g. 2D fiducial, IR reflective or active marker based) on the base. The motion tracking system may not be needed if repeatability of sensing kinematic very high. For example, when the robotic arm has revolute joints with high encoder resolution and stiff links to determine the resulting sensor poses accurately. This example may be more suitable or feasible for a single custom profile sensor as described below.

In yet another embodiment, sensing may be from one or multiple mini unmanned aerial vehicles (UAVs), such as drones, dispatched from the mobile platform. The UAVs could land on or beside previously placed objects in case of installation on a horizontal surface. The UAVs could roughly position themselves relatively using vision (e.g. with help of fiducials on end effector). The UAVs could be configured to sense their pose with respect to a previously placed object fully (one such object is sufficiently within their sensors' field of view). Their pose with respect to the mobile base could also be determined with a tracking system (e.g. an LED marker based 3D motion capture system). The features measured by the UAVs could thus be transformed into a common, fixed frame to determine the full DOF of the involved objects. The UAVs could also accurately determine their pose with respect to the end effector using vision (camera on UAV and markers on end effector or vice versa), taking advantage of a smaller required field of view and allowing the common frame to be the end effector frame itself.

In a further embodiment, sensing may be from one or multiple measurement stations placed with the manipulator on or beside or around previously placed objects (eye-to-hand sensing). Considerations may be similar to those concerning the UAVs.

Figure 6E:
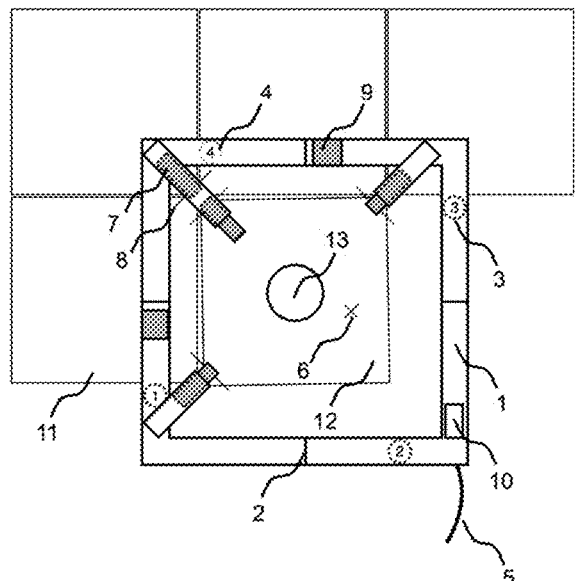
FIG. 6E shows an example of a single measurement station according to various embodiments.

FIG. 6E shows a schematic diagram of a measurement station according to various embodiments. FIG. 6E shows a frame 1, a prismatic joint 2 allowing reconfiguration (e.g. telescopic mechanism actuated with linear actuator), extended foot 3, retracted foot 4, cables 5 connecting to the base, Centre of Gravity 6 of whole structure, integrated profile sensor 7, sensing plane 8, a camera 9 looking at end effector, an inclinometer 10, an object 11 on surface, an object 12 to be placed on surface, a representing end joint 13, i.e. its position during final placement of an object.

For example, the single measurement station (as shown in FIG. 6E) could also be a reconfigurable frame 1 placed around the area of the surface where an object 12 is to be placed next. The structure may mount integrated profile sensors 7 so as to implement an augmented sensing concept including dimensions (similar to FIG. 6C and FIG. 6D). It may include four retractable feet of which three are deployed at a time (1-3 for left to right placement, 2-4 for right to left placement) to support the structure on the surface (i.e. the floor) and suspend it above objects on the surface. The structure is configured so that its Center of Gravity 6 allows it to rest stably in both feet configurations. Like various end effector embodiments, this frame could further comprise an inclinometer 10 (to sense an absolute reference for roll and pitch) and one or more cameras 9 arranged to capture markers on the end effector for precisely determining its relative pose (in case of one or more custom profile sensors used, these may also fulfill the function of such cameras). It may further include features which facilitate coupling to the end effector for placement with the manipulator. This may also allow the robotic arm to handle heavier objects as sensing structure and object do not need to be carried at the same time. Such measurement station may be primarily suitable for floor placement.

Accordingly, the robotic arm may pick up the measurement station from the base. The structure may reconfigure itself (in dimensions, feet according to placement direction) possibly in air, for a new object size (or if stored in smallest configuration on the base). The structure may be placed on floor. The robotic arm may pick up an object (which may not be strongly misaligned) and then lower it into the frame and move it laterally into the field of view of the sensors. Placement then occurs similar to various other embodiments. After release of the object and final measurement of its pose, the frame 1 is either moved to the next location on the surface or brought back to the base.

According to various embodiments, if there are errors in the alignment of the previously placed objects 103, using them as a reference (even if sensed completely and with a high accuracy) in combination with ideal placement rules (possibly only represented as an absolute, ideal pose) would not exactly define an ideal relative goal pose for the current object 101. So an approximate solution may be needed, with a possible optimization procedure observing visual criteria and minimizing the accumulation of global errors.

In one embodiment, the placement and positioning method may conceptually be subdivided into three mutually dependent but separate steps, whereby the addressed precision depends on the requirements of each step.

The first step takes care of the navigation and positioning of the system 100 at the macro scale which is represented by the whole area to be covered with objects (e.g. a room to be tiled). At this level, for instance, the system 100 recognizes the walls of the room as the boundary using data acquired from the integrated mid-range distance sensor(s) (e.g. LiDARs) and possibly cameras. Thus the system 100 can localize itself with respect to the uploaded floor plan but also generate a new floor plan (or map), compare it to the uploaded floor plan and alert the operator in case of significant differences, between digital blueprint and on-site reality. The object layout contained in the work plan loaded into the control mechanism of the system 100 (among the laying sequence, mobile platform poses, the ideal floor plan and other information) is then transformed into this floor plan.

The second step is performed once the system 100 has reached the planned working position with an accuracy of approximately +/−10 cm or better. The robotic arm 120 scans the surface at the location where the last placed objects 103 are expected to be with short-range sensors (e.g. profile sensors) mounted on the end effector 130. At implementation level, the sensor data is used to calculate the 6 DOF pose of a known, previously laid object 103 in the end effector frame and this result may subsequently be fused with all previously acquired information, improving (in terms of absolute accuracy and uncertainty) the current estimate of the end effector 130 or mobile platform 110 pose in the world reference frame. This essentially allows recalibrating the pose of the end effector 130 (and thus the mobile platform 110) with an accuracy of approximately +/−1 mm or better with respect to the set of objects laid previously.

The final step is the placement process of the object 101. In order to consistently meet the placement quality standards over larger extensions, the targeted accuracy at this stage is in the scale of approximately +/−0.2 mm or better. If this accuracy is beyond the capabilities of the robotic arm 120 (e.g., due to modelling or controller errors) and the mechanism behaves as a dynamic system at this resolution (e.g. bending of the robotic arm 120 due to the forces originating from the friction between object and bonding material) this last step can only be achieved by (typically real-time) closed-loop or feedback control based on sensing of the objects.

At each iteration of the feedback loop, the control input is derived from the difference between the current and the desired/goal pose of the gripped object 101. As the object 101 is typically not to be placed on a solid surface but on a viscous material (e.g. in case of laying tiles; or the work piece itself—object 101 with bonding material—could be considered deformable), this placement task is not naturally constrained in any of the 6 DOF (though considerable contact forces occur in some DOF). Thus the task becomes determining the optimal 3D pose (position and orientation) of the work piece relative to other 3D objects. Those can be the adjacent objects 103, the local plane of the planar surface (i.e. the floor) and/or the reference placed by the operator. In cases where this is not constraining enough, the ideal, pre-planned pose on the surface is factored in. Most of the relevant properties of these objects can be calculated at each loop iteration from the measurements of high-speed and high-resolution profile sensors. Otherwise information from a model with random variable parameters may be used. The algorithm to determine the optimal pose considers criteria such as distance and parallelism of adjacent opposite sides, levelling of adjacent planes or offset from the surface plane or potentially an absolute reference plane. The absolute reference plane may be a projected laser reference plane from a corner of the room that is sensed from the end effector. In order to adaptively compensate for previous errors and bound their accumulation, a small correction may be applied in addition. Using information from the aforementioned model, the object neighbourhood may be analysed for the erroneous trends or defects illustrated in FIG. 10 to determine this correction in an optimization process, always trying not to exceed the threshold of what a human eye can identify as an imprecision. After release of the object, its pose is measured again and used to update the model.

Figure 11:
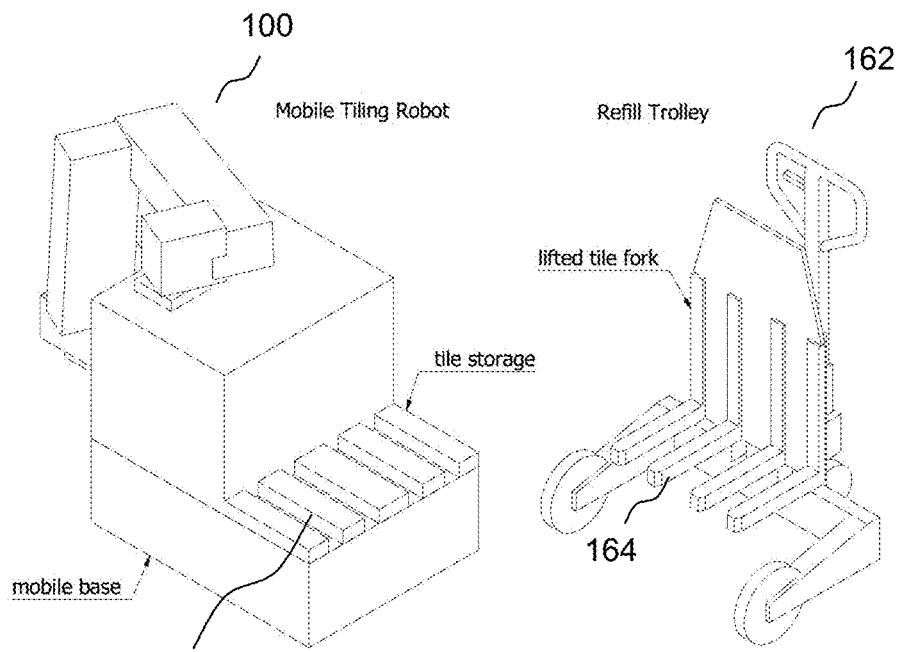
FIG. 11 shows an object storage apparatus and a refill trolley according to various embodiments.

The system 100 may also include an object storage apparatus 160 as shown in FIG. 1 and as shown in FIG. 11. FIG. 11 shows the object storage apparatus 160 and a refill trolley 162 according to various embodiments. The object storage apparatus 160 may be a structure that allows the objects to be stacked as a pile (without any precise alignment between the stacked objects) and facilitates automatic unloading of an already stacked pile onto it by allowing a refill trolley 162 with a fork 164 that carries the pile to be inserted.

Figure 12:
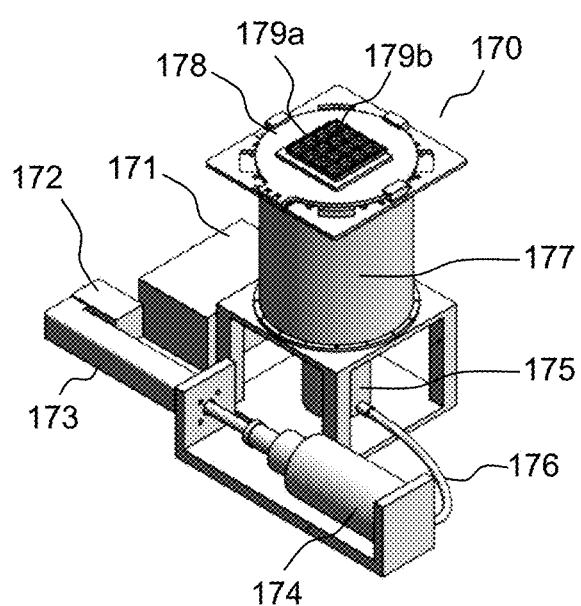
FIG. 12 shows a bonding material application apparatus according to various embodiments.

The system 100 may further include a bonding material application apparatus 170 for application of bonding material to the object as shown in FIG. 1 and as shown in FIG. 12.

In one embodiment, a control mechanism 180 or a control network may be needed to operate the system 100. The information of the actuated mobile platform 110 (incl. stabilisation mechanism), the robotic arm 120, the vacuum source, the pneumatic valves, the bonding material application apparatus 170 and the sensors may be fed to the control mechanism. This information may be distinguishable from the information needed for the closed-loop control received from the end-effector 130 mounted sensors (in particular the profile sensors 150) and possibly the robotic arm 120 (and the information from the model). The latter information may be utilized to control the poses (and possibly twist and wrench) of the end effector 130 by computing the current errors from the desired pose. This information derived from the aforementioned errors may ultimately be used as control inputs for the embedded controller of the robotic arm 120. The control mechanism 180 may be powered by a power source.

In one embodiment, the control mechanism 180 or the control network may include a main controller for controlling high level machine logic such as the interaction between the various components of the system 100. The control mechanism 180 or the control network may further include an embedded controller in each of the components, for example at the robotic arm 120, the mobile base 110, or the bonding material application apparatus 170, for localise control and operation of the respective components.

The system 100 may also include additional structures 185 or a jig that are specifically configured and are of precisely known geometry as shown in FIG. 13A. FIG. 13A shows the structure 185 for measuring dimensions of a tile according to various embodiments. FIG. 13B shows a rectangular tile being measured. FIG. 13C shows a square tile being measured. These structures 185 may enable measurement of the dimensions of the currently gripped object 101. It includes features 187 to accommodate an object 101 (which serve as a measurement reference, e.g., contact surfaces for the object's underside and two adjacent sides) and auxiliary reference features 189 (e.g., in a close proximity to the opposite adjacent sides) to be perceived together with the object sides (that are not in contact with the apparatus) by the profile sensors 150 on the end effector 130.

In one embodiment, the structure 185 is configured for three different object sizes (that may work with an end effector 130). Possibly, the structure 185 is mounted in such a way that the gravity force vector is tilted towards an intersection point of the planes of the object that are in contact with the structure 185.

For a cuboid shaped object, such as a rectangular tile, the robotic arm 120 presses its underside and two adjacent sides against the measurement references 187 of the structure 185 to ensure close contact after placing it in the structure 185. If the object sides are not perfectly planar (e.g., displaying a small draught) and as a consequence the edges (which the sides form with the large upper surface of the object) are not in contact with the measurement reference surfaces 187 of the structure 185, the gap can be taken into account by measuring the width with the profile sensors after placing an object in the structure 185.

By synchronously taking a measurement with all profile sensors 150 from a single pose of the end effector 130, the distance from one side of the object to the auxiliary reference feature 189 can be determined. As the distance between the latter and the opposite contact surface 187 is calibrated, and as the opposite object side is considered identical to said surface, the distance between the opposite object sides that constitutes the respective object dimension can be inferred.

As only data acquired from a single end effector pose is required and processed, the resulting dimensions are free from errors that a movement of the articulated arm 120 would introduce (e.g., due to inaccuracies in its kinematic model).

This concept can be adapted to objects with an outline that is not composed of opposite parallel lines. It results in a fully passive measurement structure 185 without additional sensors or mechanisms (which would add more complexity and failure modes). Without this measurement procedure, unobserved dimensional tolerances of the objects of e.g. +/−0.3 mm would cause placement errors which would propagate and potentially accumulate to erroneous offsets above acceptable thresholds.

In another embodiment, a measurement structure may differ from the measurement structure 185 in FIG. 13A in that measurement happens before the object is gripped, when the object is still on stack. The measurement structure may include only auxiliary reference features (i.e. no contact surfaces). For example, the auxiliary reference features may be in the form of a "ring" or a closed loop rim/border structure around the upperside of the top object on the stack. Further, either the ring is automatically moved down or the stack is moved up after the top object has been removed. As there are no opposite contact surfaces, after the first measurement, the end effector 130 is turned by 180 degrees (using only wrist 3 joint) for a second measurement of the distances to the opposite auxiliary reference features. Furthermore, the error in the relative end effector pose introduced by this limited movement is considered negligible. Accordingly, the object dimensions (except for the height) may be inferred. This embodiment may save space on the system 100.

In yet another embodiment, four measurement sets may be taken without using any reference features or measurement structure. This embodiment may require utilizing the sensing concept with dimensions (as in FIG. 9B). Further, between each measurement set, the end effector 130 is turned by 90 degrees. At the end, the sets are fused to calculate the final dimensions (e.g. in a global optimization step) of the object. Furthermore, additional sets could be added to estimate the parameters of a more detailed geometric model of the object (e.g. opposite sides not parallel).

The system 100 may further include a structure specifically configured and having precisely known geometry (or color/brightness patterns of precisely known dimensions) that may be perceived by the profile sensors 150 on the end effector 130 (in case of patterns, greyscale images would be transmitted from the profile sensors). The data acquired may enable an automatic process to determine the extrinsic calibration of the profile sensors 150, which is required to compute more abstract properties (such as the pose of the gripped object in the gripper reference frame) from the combined measurements of multiple sensors with sufficient precision, after reconfiguration of the end-effector 130, and allows recognition of changes over time (or due to the severe event of an impact). In one embodiment, the intrinsic calibration of camera with lens in case of custom profile sensors may be additionally determined, in order to detect drift from the off-site calibration or factory calibration. The system 100 may also include an integrated object cutting apparatus on the mobile base 110. The cutting tool herein may be a spiral saw or a disc saw. In one embodiment, the cutting apparatus may be a companion device.

According to various embodiments, the system 100 may also include a support material application apparatus for applying support material to objects for vertical (or much inclined) installation. The support material application apparatus may be configured to inject non-rigid support material (e.g. a thermoplastic polymer) in spots underneath the object brought into a desired pose, which is either vertical or inclined. Accordingly, the support material may be injected into the gap between the object to be placed and a previously placed object on the surface, which may be adjacent and/or below. Hence, the support material may be injected between the sides of the objects. According to various embodiments, the support material application apparatus may be at the end effector. According to various embodiments, the support material application apparatus may be coupled to a reconfigurable structure which is attached to the system 100, for example at the end effector.

According to various embodiments, once the support material becomes rigid, the object may be released from the end-effector such that the weight of the object may be held by the bonding material adhering the object to the surface as well as the support material that is at the bottom edge of the object. According to various embodiments, cooling/hardening of the support material may be accelerated, when the object is in the desired pose, by blowing air at it (to help convection) from the end effector or other means.

According to various embodiments, the support material may include materials (e.g. UV curing glue) which may harden or cure via activating or at least accelerating by exposing to light of a certain wavelength (e.g. UV light) or with other specific properties from the end effector. Accordingly, if hardening/curing may be activated by exposing to certain conditions, it may be easier to apply the support material along a base edge of the object after bonding material is applied to the back surface of the object. According to various embodiments, the support material may be applied in a way such that the support material may be subsequently set back within the gap from the object surface so as to allow grouting of the gap later. According to various embodiments, the support material may be applied in a way such that the support material may stick out to facilitate later removal, possibly with the help of a removal tool.

According to various embodiments, the system 100 may further include an absolute level referencing apparatus. The absolute level referencing apparatus may be coupled to the end effector (and it that case may substitute an inclinometer). The absolute level referencing apparatus may work together with a component placed on the surface or in the room. According to various embodiments, the absolute level referencing apparatus may provide additional information to be taken into account for determining the desired/goal pose, in similar fashion to the inclinometer (may be factored in with the information from the one or more sensor unit 150 to help reduce drift). According to various embodiments, while the inclinometer may provide an absolute attitude (roll/pitch) reference, the absolute level referencing apparatus may provide an absolute level reference (e.g. absolute reference plane in the room, reference for roll/pitch/z). According to various embodiments, the absolute level referencing apparatus may include projecting a laser plane from the component placed in the room (e.g. a corner). According to various embodiments, if at low level, one or multiple detectors may be coupled to the end effector. According to various embodiments, the detectors may also be coupled to the base of the system 100, on the sides (when projection low) or on pole(s) on top (when high).

According to various embodiments, the system 100 may include two robotic arms. Accordingly, in the two robotic arms configuration, the system 100 may be able to handle heavier objects which may be too heavy to be handled with one robotic arm. In such an embodiment, the one or more sensors units may sense the object to be placed with respect to a sensor frame. By determining the relative difference between the current pose of the object to be placed and the desired pose of the object to be placed, the two robotic arms may be controlled accordingly to move the object to be placed, which is held by the to robotic arms. According to various embodiments, the two robotic arms may include two parallel multi-DOF serial kinematics.

As shown FIG. 12, a bonding material application apparatus 170 for a bonding material such as tile adhesive may include a real time control system, a motor driver, a direct current (DC) electrical motor, a ball or trapezoidal screw, a hydraulic transmission having hydraulic cylinders, a metal piston, removable & vertically mounted tube (e.g. plastic), an end plate and an applicator plate. The bonding material application apparatus 170 may be integrated with a robotic unit (described above).

In one embodiment, the real-time control system and motor driver may be provided as a control unit 171. The real-time control system and motor driver may be connected to the DC electrical motor 172 with an optical encoder and gearbox.

The DC electrical motor 172 may be further coupled to a ball or a trapezoidal screw extending rod actuator 173 with magnetic switches.

The ball or trapezoidal screw extending rod actuator 173 may be coupled to a hydraulic transmission 174. The hydraulic transmission may include one or two large, single- or multi-stage (possibly constant speed) single or double acting hydraulic cylinders in parallel.

The hydraulic transmission 174 may be coupled further to a hydraulic cylinder 175 via hydraulic piping 176. The hydraulic cylinder 175 may be connected to a metal piston. The hydraulic cylinder 175 may include one or three small double- to quadruple-stage (possibly constant speed) hydraulic cylinders, arranged to be in a triangle (for three cylinders).

In another embodiment, as an alternative to the hydraulic transmission 174, the rod actuator 173 could be connected to a scissor mechanism (also in a configuration where both ends of the actuator are attached to scissor members, in which case a hydraulic transmission system with single-stage cylinders may still remain).

The metal piston connected to the hydraulic cylinder 175 maybe configured to removably receive a (possibly self-lubricating) plastic piston, which tightly closes the lower end of a removable, vertically mounted (e.g., plastic) tube (also referred to as a cylinder or a reservoir) that may form a bucket to store 10-30 liters of application-ready bonding material such as tile adhesive (and has features which facilitate removal of the removable tube from the bonding material application apparatus 170).

The removable tube that holds adhesive material may be fitted into a rigid, vertically installed metal tube 177 configured for supporting the removable tube, which is closed with a round plastic or metal end plate 178 which may have a square grid of holes 179*b* for the adhesive to pass through. The metal plate 178 may be secured to the fixed tube 177 by a screwed-on ring or a hinge and multiple latches. The metal plate 178 may include brackets screwed on the upper side, which allow insertion of an exchangeable applicator plate 179a having the square grid of holes 179b. Each hole may include a cavity of specific geometry (such as a half-sphere, opening to the upper side of the applicator). Further, the applicator plate 179a may possibly have a coating that repels the adhesive and a border around all cavities (possibly with elastic features to support its function as a seal).

The method of applying bonding material using the bonding material application apparatus 170 for a bonding material may include a step whereby the underside of an object is pressed against the applicator plate 179a. The pressing is performed by means of the robotic arm 120 and results in enclosing a cavity formed between the underside of the object 101 and the applicator plate 179a).

Subsequently the method includes a step whereby the bonding material is pressed into the enclosed cavity until it is filled.

The method of bonding also includes a step whereby the object 101 is lifted up (and if applicable, shifted in the X-Y plane to move an uncovered area over the applicator plate 179a). According to various embodiments, the bonding material may be separated from the applicator plate 179a when the object 101 is lifted up and thus leaving a layer of adhesive on the object. According to various embodiments, a separation layer within the bonding material may be created when the object 101 is lifted up, with one part of the bonding material sticking to the applicator plate 179a and the other part sticking to the object 101.

Finally, the method also includes a step whereby the object 101 is placed onto the planar surface (e.g., screed floor), in a slow Z motion, possibly combined with fast motions in the object underside's plane (later followed by closed-loop fine positioning), configured to spread the bonding material (while potentially slightly lowering its viscosity), leading to a uniform layer, covering completely both the planar surface and the object underside.

In another embodiment, a method of operating the system 100 includes multiple steps.

The method includes a first step of loading initially known information required by a control program for laying the objects (a "work plan"). The information and the work plan may be loaded into the system 100 beforehand (before bringing the system 100 to the worksite). The information or the work plan may also be created in situ ad hoc and loaded into the system 100 at the worksite. For example using direct inputs into a graphical user interface (e.g. to set the parameters of the object to be placed), defining certain boundaries in the room with a reference object that is perceived by the system 100, or moving parts of the system 100 to a to be taught location, etc. The information may include (i) dimensions (ideal or measured beforehand), mass, surface properties and arrangement (i.e., a ideal goal/desired pose relative to each other or absolute, relative to a global frame of reference) of the objects to be placed, and (ii) shape/ dimensions of the planar surface on which the objects are to be placed, of adjacent or enclosing planar surfaces or a full two- or three-dimensional representation of the geometry (i.e., a "map") of the surrounding environment.

The method includes a second step of placing one or more physical border references on the planar surface with a pre-defined offset from where the border(s) of the first object(s) are desired to be placed. The physical border references may be for each dimension in the planned object arrangement (e.g., a column) that exceeds a single object. The physical border reference may be placed in order to fix the position and orientation of the planned object arrangement on the planar surface. In one embodiment, when an augmented sensing concept is utilized, a single main reference may be sufficient. It should be appreciated, however, that while the objects are placed relative to each other with a high precision, the position of the whole arrangement with respect to a room is of lower precision due to the limitation placed from the precision of the mobile platform localisation. This may be alleviated by placing such physical border references which the system can perceive more precisely. According to various embodiments, the physical border references may include previously placed objects.

In one embodiment, the physical border reference is a wire rope that is strained at approximately 5 mm to 20 mm height above the planar surface. If needed, the physical border reference is aligned to a laser line projected (e.g., by a device available as "tile laser") from the corner of the planned object arrangement (where two straight segments of the outline of the planned object arrangement intersect). According to other embodiments, the wire rope may be replaced with a fibre rope or tape, which is possibly stored in a self-retracting reel fixed to the ground.

In another embodiment, the physical border reference may be an outer wall/peripheral structure of a frame in which the objects can be placed.

In another embodiment, the border reference is a laser line projected (e.g., by a device available as a "tile laser") onto the planar surface and the end effector 130 is equipped with sensors to perceive it.

In an alternative embodiment, some sides of the outline of the planned object arrangement may not be straight (i.e. are composed of sides of the objects that are not collinear or parallel), for example in an object arrangement where every other row is shifted by half of the object length (e.g. as commonly seen with 300 mm×600 mm tiles). Accordingly, the physical border reference may include precisely manually laid cut objects with the cut sides aligned with the border of the planar surface.

In another embodiment, a tracking total station is placed on the planar surface, for example at the corner of the area where the objects are to be placed. In such instance, two or more points on the planar surface may be referred in order to fix the position and orientation of the planned object arrangement on the planar surface.

The method also include a third step of loading the system 100 with the physical resources required to carry out the construction job (e.g., laying an arrangement of objects), i.e. loading it with the objects to be placed (e.g., ceramic tiles) in the next batch. Loading may include docking a trolley stacking the objects to the system 100. Loading may also include placing the physical resources nearby (e.g. at the entrance of a room in case of a cable suspended platform).

The loading may also include loading the system 100 (specifically the bonding material application apparatus 170 and/or the support material application apparatus) with a bonding material (e.g., cement-based tile adhesive) and/or support material.

Furthermore, the loading may also include loading the system 100 with recharged swappable battery/batteries.

In one embodiment, the third step may be carried out with a dedicated refill trolley 162 in FIG. 12, which is configured to facilitate transporting and unloading (and placing, in some instances) of the objects onto the system 100 with the aim to simplify and speed up the process and minimize the lifting work for the operator.

The refill trolley 162 may furthermore be electrically actuated and able to both autonomously navigate between the material storage and preparation location and the system 100.

The method may also include a fourth step of placing the system 100, which has a wheeled or legged mobile base 110, nearby a physical reference on a surface even enough (e.g., a screed floor) to allow reaching its working positions by using its drive train and starting the control mechanism 180 that progressively places the objects 101 in the sub-area as marked off from the overall area by the physical references (after initially finding and driving close enough to such references). The autonomous function of finding and driving close to such references may be an optional function of the system 100. This may be activated after the operator placed the system 100 onto the drivable floor (e.g. screed floor). If the operator places the system directly at the working position, this function may not be activated. In case the planar surface on which the objects are to be placed is vertical, the planar surface on which the system 100 is to be placed may be a different, likely perpendicular and adjacent surface.

The fourth step of the method may further include manually steering the system 100 with a remote controller to position it within the reach of the physical reference(s) by the robotic arm 120 (e.g., intersection or corner of two physical references), i.e. at the starting point.

The system 100 may locate and may reach the starting point as described autonomously using information from the work plan and its sensors.

The second step is repeated for placing an additional batch of objects (e.g. when the system 100 has run out of objects to place). In addition to that, the second to fourth steps may be repeated when starting to place additional batches of objects in a new sub-area of the overall area where the objects are to be placed (likely a disjoint region).

FIG. 14 shows a schematic top view of a system (or an apparatus) 1400 for placing objects on a surface according to various embodiments. The system 1400 may include a mobile platform 1410 with four powered steered caster wheels (not visible) (e.g. omni drives). The system 1400 may also include a bonding material application apparatus 1470. The system 1400 may also include an object storage apparatus 1460 for stacking objects on the base 1410 (e.g. for flat objects up to 60×30 cm). The system 1400 may include a 6 DOF serial kinematic (all revolute joints) robotic arm 1420. The robotic arm 1420 may include a non-reconfigurable end effector 1430 with four integrated profile sensors 1450 for the basic sensing concept.

Figure 15A:
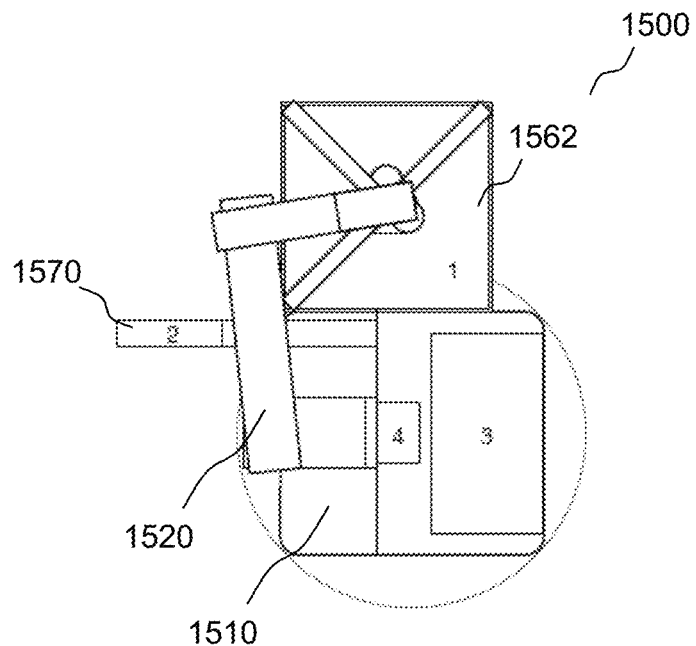
FIG. 15A shows a schematic top view of a system for placing objects on a surface according to various embodiments.
Figure 15B:
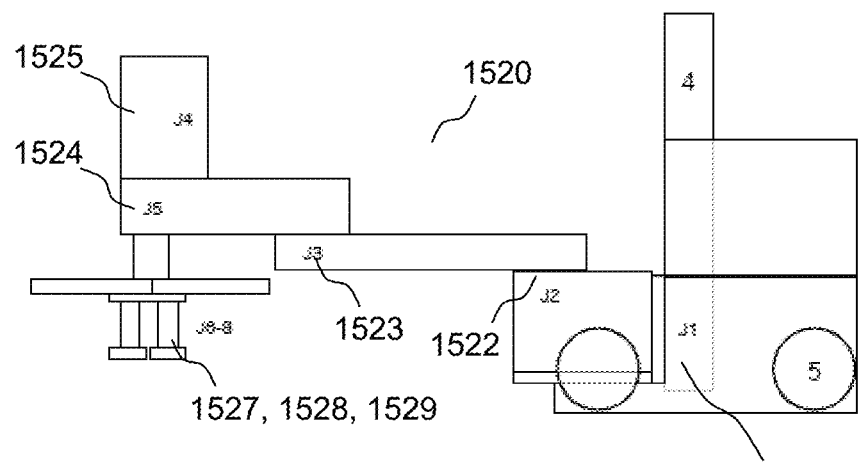
FIG. 15B shows a schematic side view of the system of FIG. 15A with robotic arm extended.

FIG. 15A shows a schematic top view of a system (or an apparatus) 1500 for placing objects on a surface according to various embodiments. FIG. 15B shows a schematic side view of the system 1500 of FIG. 15A with robotic arm 1520 extended. The system 1500 may include a mobile platform 1510 with four powered steered caster wheels 1512 (e.g. omni drives). The system 1500 may also include a bonding material application apparatus 1570. As shown, a separate object stack trolley 1562 for objects up to 60×60 cm may be docked on a side (e.g. right side) of the system 1500. The system 1500 may include a robotic arm 1520 with 5 DOF serial kinematic (1 prismatic joint 1521 for Z long, 3 revolute joints 1522, 1523, 1524 with parallel vertical axes, "SCARA" configuration, 1 prismatic joint 1524 for Z short, technically before last revolute joint 1524). The robotic arm 1520 may have a further 3 DOF parallel kinematic (3 prismatic joints 1527, 1528, 1529) for roll/pitch/z fine adjustment (J6-8). In one embodiment, the robotic arm 1520 may not have the prismatic joint 1524 before the last revolute joint. In one embodiment, the robotic arm 1520 may include a non-reconfigurable end effector with four custom profile sensors for augmented concept including dimensions. FIG. 15B shows a side view of the system 1500 with the manipulator 1520 extended without gripping any object, and without the object stack being visible.

Figure 16:
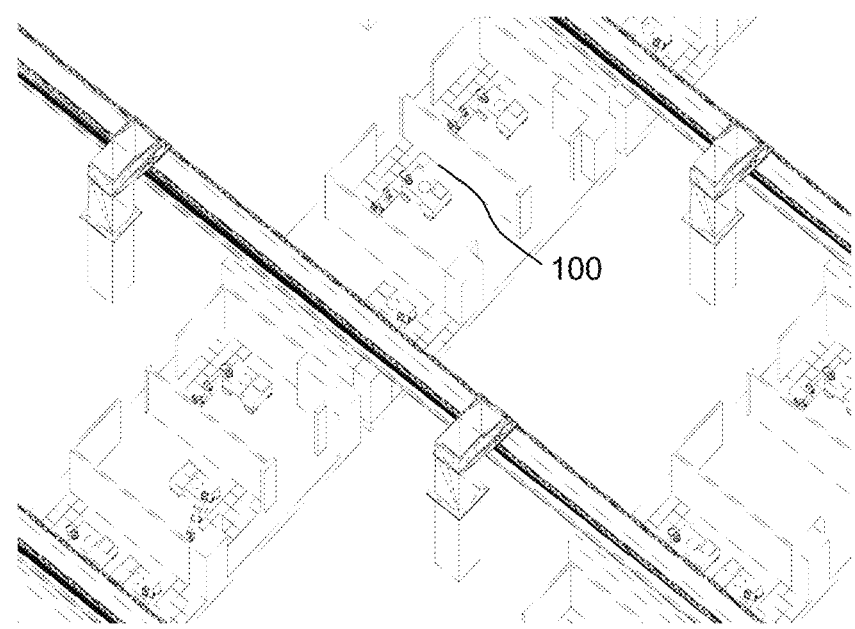
FIG. 16 shows an example of the system application on prefabricated prefinished volumetric construction (PPVC)

In one embodiment, the method of operating the system 100 may further include application on prefabricated prefinished volumetric construction (PPVC) (as shown in FIG. 16) and prefabricated bathroom unit (PBU) facilities where the system 100 can be employed in PPVC or PBU units composed of a steel frame with Engineered Cementitious Composite-Crete walls or with Autoclaved Aerated Concrete walls or with a combination of ECC-Crete and AAC walls, reinforced concrete (full volumetric concrete construction), a metal frame with drywalls, a metal frame with metal walls, and a metal frame with lightweight panels.

The method may also be applied on construction sites or in automated production processes in facilities (e.g., Integrated Construction and Prefabrication Hubs (ICPHs)) where precast concrete or steel structures are used or produced or stored. The ability of the system 100 to be employed directly in the facility or by the ability of the said base joint 121 of the said robotic arm 120 to be mounted on prefabricated hybrid structural systems like precast column and steel structures (PCSS) which may use prefabricated reinforcement cages or on slabs which may use carpet reinforcement, etc.

The method may also be applied in Cross Laminated Timber or Glued Laminated Timber constructions of walls, floors, roofs or structural beams and columns, or in facilities where CLT or Glulam are used or produced or stored if any part of the construction is to be finished with engineered timber flooring having a top layer of hardwood and a bottom core of plywood layers in addition to conventional parquet.

Figure 17:
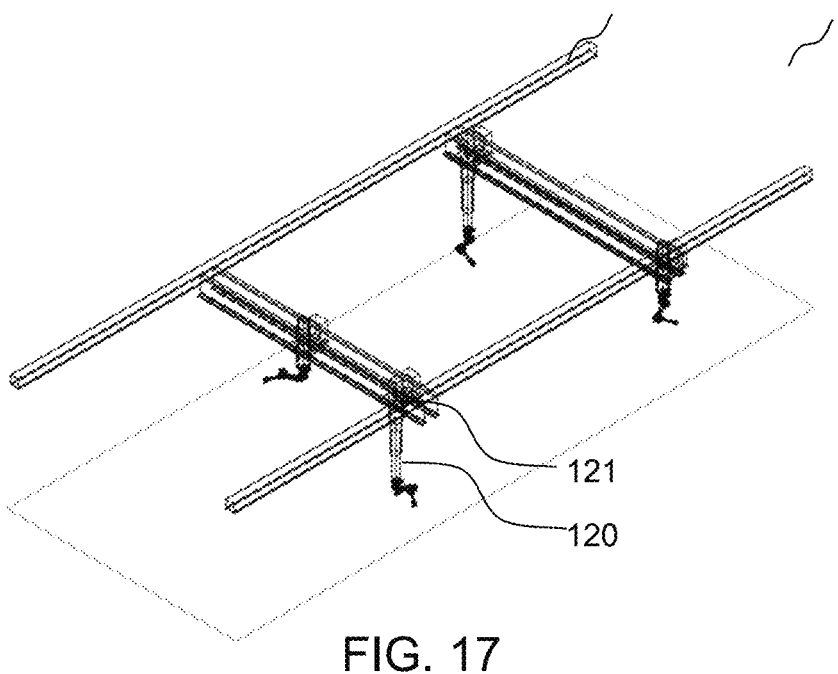
FIG. 17 shows an example of the system including a gantry system installed in a prefabrication facility.

The method may be applied in a semi- or fully automated construction/prefabrication facility (as shown in FIG. 17) where the base joint 121 of the robotic arm 120 is mounted on a gantry 1909 where a multi-robotic system based on an overhead running gantry system 1900 is installed to enable object placement possibly with human-machine cooperation, as well as advanced automated factory-based digital fabrication processes.

The method may be performed using embodiments of the system 100 (heavy or light weight, collaborative, high or low payload industrial robot arm) with 10 kilograms (kg) or more payload where the operator can work together in a shared workspace without safety fences to place objects for surface finishing in commercial buildings, hospitals, community centres, "hawker" centres aka food courts, airports, MRT or train stations in addition to public and private housing projects.

The method may also be utilized on a heavyweight non-collaborative high-payload industrial robot arm, whereby the operators do not work together in a shared workspace without safety fences in order to place objects for finishing surfaces in commercial buildings, hospitals, community centres, "hawker" centres aka food courts, airports, MRT or train stations in addition to public and private housing projects.

There are other features that may form part of one or more embodiments that are mentioned above. These features may include initial localization and mapping in a room with a surface where objects are to be placed (e.g. using two dimensional simultaneous localization and mapping: 2D-SLAM or e.g. using three dimensional simultaneous localization and mapping: 3D-SLAM, considering initially only features of the room), which may be utilized for comparing the generated map with the map attached to the work plan and report significant deviations.

The features may also include cleaning of optical sensors by moving them over a compressed air outlet on the platform 110, generating a detailed quality assurance (QA) work report (incl. a 3D model) showing the precision achieved and highlighting problematic areas that require closer inspection and perhaps manual correction.

The features may also include dedicated sensing to ensure a clear space within base footprint and arm workspace during operation, cleaning of the underside of objects 101 from dust with compressed air prior to adhesive application for better bonding, cleaning of the floor from dust with compressed air from the end effector 130 prior to object placement, just after placing an object 101 when the gripper is empty, for better bonding, determining required dimensions of partial objects such as border objects (from sensed laid full objects and walls) and submission to operator, a separate on-site cutting and stacking machine (tray to be moved onto the system 100) or a cutting apparatus on the system 100 itself, optical sensing and analysis of an object's pattern (e.g., for non-homogeneous tiles) before gripping, with option to store a small number of objects on the system 100 (or sort out), to allow for automatic matching of patterns within a cohort.

Furthermore, the features also include photography of every laid object from the end effector 130 or gripper and automatic, pose-corrected stitching together to an image of the whole object arrangement, as a visual documentation of the work result, suitable for remote inspection; inspection of floor surface prior to object placement by means of computer vision to ensure no debris is present; using a camera on the end effector 130 for recognition of QR codes (or similar identifying machine-readable optical label) previously placed in the room by the operator as additional information to identify the room and to reference and possibly download a corresponding work plan and/or BIM model; using a camera on the end effector 130 (possibly part of a custom profile sensor) for recognition and localisation (6DOF pose, in the end effector reference frame) of artificial visual landmarks of known dimensions (aka fiducials, usually pattern of high contrast and providing rich information, usually providing unique identification, e.g. QR, AprilTags or ArUco markers), placed in advance by the operator (e.g. fiducial stickers, freely placed on the wall every meter at about 40 cm height, or a tape with printed-on, possibly equally spaced at known distance, fiducials applied to the wall), with pose measurements used in a similar fashion as those of the objects placed (represented in the model, fused in a similar fashion with earlier information as described before, serving as a map), allowing to reduce drift, particularly during relocation of the platform.

In one embodiment, a control mechanism 180 for operating the system 100 may include steps to execute a high-level cycle to place an object 101, which includes (i) parse a work plan, (ii) localize the system 100, (iii) find physical references and starting point, possibly measuring the surface where the first object is to be placed (iv) lower the feet 114 of the system 100 to render it stationary, (v) pick up an object 101, measure its pose on the gripper/end effector 130, (vi) measure its dimensions, (vii) apply the bonding material to the object's underside and possibly the planar surface, (viii) place the object 101 relative to the physical references on the planar surface, (ix) measure the resulting object 101 pose after release, and possibly the surface where the next object is to be placed, (x) pick up next object and repeat steps until no more objects are left in the patch, (xi) retract the feet 114, (xii) drive the base 110 to a next placement position, (xiii) measure the pose of a previous object to reduce uncertainty in the base pose, (xiv) lower the feet 114 and repeat the steps (v)-(x) mentioned above.

The control mechanism 180 may also include a step which implements a specific sensing and control concept necessary to achieve the required placement precision. This can be performed through (i) continuous measurement of the 6 DOF pose (or 3 DOF of the pose if it is otherwise mechanically restricted in a precisely known fashion) of the object to be placed 101 with respect to a frame of reference on the end effector, (ii) closed-loop control of the 6 DOF pose of the end effector and by extension the object to be placed 101 relative to the previously placed adjacent objects on the surface (and/or the floor plane and/or physical references such as a string placed by the operator) using real-time sensed or estimated information to determine such pose, (iii) determining a goal pose for the object to be placed depending on adjacent and further away objects, using information on such objects from the model, optimizing towards geometric, visual criteria on a local and global scale, (iv) possibly estimating the poses (and potentially their full history) of the end effector and all objects placed on the surface using probabilistic multi-modal sensor fusion, realized with a recursive filter or a global optimization scheme (with potentially further variables incorporated into the state such as poses of other parts of the robot or features of the room), building up and updating a model of work done, and (v) an alternative force-torque-sensing based positioning for gap free arrangements.

The control mechanism 180 may also include a user interface to the system 100 that provides multiple features. Amongst the features are: (i) detachable corded tablet (similar to teach pendant) displaying a touch-GUI, (ii) basic operation of: load, preview and start execution of plans, (iii) in case of severe placement errors, that the operator is presented with choices on how to correct, (iv) means to send alerts to operator's smartphone, (v) an interface to correct object layout in case plan not executable, auto-generated suggestions for alternatives and (vi) an interface to adjust parameters of the plan, e.g. if different objects need to be used on-site which are heavier than the ones the plan was made for.

In one embodiment, a desktop application or tablet software to generate and assemble the initially known information (the "work plan") required by the control mechanism 180 of the system 100 enables the following workflow: (a) import floor plan (or plan of the planar surface) from various formats (e.g. from BIM), (b) select the relevant area for objects to be placed, (c) specify the types of objects to be used in the layout (e.g. shape, ideal dimensions, weight etc.; possibly select objects from database), (d) compose a "primitive stamp" for the desired pattern, incl. desired gap size (its outline is checked for feasibility of execution, e.g. toothing of elements), (e) set the origin of the coordinate frame from which the stamp is used to expand the pattern over the placement area, shift until satisfied with the segmentation on the borders, (f) for non-homogeneous objects which have been digitally inventoried and for which the database contains adjacency relationships and possibly an image of the upper side, link at least one of the generic objects of the expanded pattern to a uniquely identified object from the database, mapping the object motifs onto the object layout, (g) make manual adjustments on a per-object basis, (h) generate the machine plan for the uncut objects (and save the plan semantics in a project file), and (i) automatic decomposition of the object layout into a sequence of ordered subsets of objects referred to as patches (so that all objects in a patch can be reached from the same stationary base pose; i.e. based on the reachability of the arm, the set of patch types that results in for the chosen pattern, and the manoeuvrability of the mobile platform) and (j) automatic planning of the associated stationary mobile base poses and possibly the paths between them.

In a first embodiment, a robotic system for placing objects on a planar surface comprising: a base assembly that is capable of moving in a planar direction; a robotic arm having two ends, wherein one end is coupled to the platform; an end effector having two surfaces, wherein one of the surfaces is coupled to the other end of the robotic arm; one or more or a plurality of suction cups disposed on another surface of the end effector, wherein the suction cups are coupled to a vacuum source and the plurality of the suction cups are capable of gripping an object when the vacuum is activated; and a plurality of profile sensors disposed on sides of the end effector, wherein the profile sensors sense the object and a previously placed object.

In one embodiment, the robotic system described in the first embodiment includes at least two profile sensors. For example the robotic system may include three profile sensors or four profile sensors or more.

In one embodiment, the robotic system described in the first embodiment wherein a resulting gap between the object and a previously placed object is a first distance, and wherein differences between the first distance and an expected first distance is 0.5 millimetres or less.

In one embodiment, the robotic system as described in the first embodiment wherein the expected first distance is between a range of 0.5 millimetres to 12 millimetres, or 1 millimetre to 5 millimetres.

In one embodiment, the robotic system as described in the first embodiment wherein the object is a tile.

In one embodiment, the robotic system as described in the first embodiment further comprising: an air compressor that is coupled to vacuum ejector to enable suction effect through the plurality of suction cups; an object storage apparatus; and a bonding material storage and application system. The object storage apparatus may be detachable.

In one embodiment, the robotic system as described in the first embodiment is controlled using a closed-loop control mechanism, wherein information is received from the plurality of profile sensors and used for controlling the pose of the end effector.

In one embodiment, the robotic system as described in the first embodiment wherein the end effector further comprises: a plurality of LiDAR sensors; an orientation reference measurement system; a vacuum ejector; a precision rabbet with calibrated geometry utilized for measuring dimensions of the object; and a plurality of features that provide a solid contact surface to the upper side of the object for constraining its movement in direction of the end joint.

In one embodiment, wherein the end effector of the robotic system as described in the first embodiment is configured based on a selected concept from a plurality of concepts consisting of: basic sensing concept, an augmented sensing concept and any combination thereof.

In one embodiment, the basic sensing concept further comprises continuous measurement of all degrees of freedom of the currently gripped object and one degrees of freedom less from all degrees of freedom of the previously placed objects.

In one embodiment, the augmented sensing concept further comprises continuous measurement of all degrees of freedom of the currently gripped object and all degrees of freedom of the previously placed objects by sampling an additional side (adjacent to the side sampled in the basic concept) of the previously placed objects, thus reaching full degrees of freedoms of the previously placed objects.

In one embodiment, the basic sensing concept and the augmented sensing concept further comprise measurement of dimensions of the object by sampling at least one additional side of the object which is opposite to a side that is to be aligned.

In a second embodiment, a method of operating a robotic unit that places objects on a planar surface comprises: finding a physical reference and a starting point; using a gripper on the robotic unit, picking up the object; using a plurality of profile sensors mounted on the robotic unit, measuring poses and dimensions of the object on the gripper; placing the object relative to physical references or previous objects on a planar surface; and using the plurality of profile sensors, measuring pose of the object after releasing. The method may further include applying a bonding material to the object. The method may further include measuring the planar surface where the next object is to be placed when a bonding material is used.

In one embodiment, the method as described in the second embodiment further comprises: using the gripper on the robotic unit, picking up another object; using the plurality of profile sensors on the robotic unit, measuring poses and dimensions of the another object on the gripper; placing another object relative to the physical references on the planar surface; and using the plurality of profile sensors, measuring poses of another object after releasing.

In one embodiment, the method described in the second embodiment further comprising: continuously measuring poses of the object on the gripper; using a closed-loop or a feedback control mechanism within the robotic unit, controlling the pose of the gripped object relative to previously placed objects.

In one embodiment, the method described in the second embodiment further comprising: estimating the pose of the gripper and all placed objects using probabilistic multimodal sensor fusion; and building up a model of the placed objects in the process.

In a third embodiment, a method of operating a robotic unit comprising: using a control program, receiving an initially known information required for placing the objects; placing one or more physical border references on a planar surface with a pre-defined offset from where the border of the first objects are desired; loading the robotic unit with the first objects; and placing the robotic unit relatively near to the area of work.

In one embodiment, wherein the initially known information of the method described in the third embodiment is selected from a group of information consisting of: dimensions, mass, surface properties and arrangement of the first objects.

In one embodiment, wherein the initially known information of the method described in the third embodiment also comprises shape and dimensions of the planar surface on which the first objects are to be placed.

In one embodiment, the method of operating the robotic unit as described in the third embodiment may further comprises: using the control program, receiving an initially known information required for laying second objects; placing one or more physical border references on the planar surface with a pre-defined offset from where the border of the second objects are desired; loading the robotic unit with the second objects; and placing the robotic unit relatively near to the area of work.

According to various embodiments, there is provided a system for placing objects on a surface. The system may include a base, a robotic arm coupled, at an end thereof, to the base, an end effector coupled to the other end of the robotic arm. The end effector may be configured for releaseably coupling to an object to be placed on the surface. The system may further include one or more sensor units on a sensor frame. The one or more sensor units may be configured for sensing a two-dimensional profile data including at least two two-dimensional profiles together comprising at least three boundary portions of the object to be placed and at least boundary portions of objects on the surface. At least two of the three boundary portions of the object to be placed may be from substantially non-parallel sides. At least two of the three boundary portions of the objects on the surface may be from substantially non-parallel sides. The system may further include a processor configured to determine at least three degrees of freedom of the object to be placed with respect to the sensor frame and six degrees of freedom of the sensor frame with respect to the objects on the surface in a three-dimensional space for determining a current pose of the object to be placed with respect to the objects on the surface based on the two-dimensional profile data. Further, the system may be configured to place the object based on differences between the current pose and a desired pose of the object to be placed determined from a model of objects on the surface in the three-dimensional space.

According to various embodiments, the one or more sensor units may include at least two profile sensors.

According to various embodiments, the one or more sensor units may include one or more imaging devices and one or more light emitting units. The one or more light emitting units may be configured to project a single line or multiple lines or a predetermined pattern of lines.

According to various embodiments, the one or more sensor units may be mounted to an expandable frame structure coupled to the end effector.

According to various embodiments, the one or more sensor units may be mounted to a fixed-sized frame structure coupled to the end effector.

According to various embodiments, the robotic arm may be configured to place the object with a resulting gap between the placed object and the object on the surface. The resulting gap may be a first distance. The differences between the first distance and an expected first distance may be 0.5 millimetres or less, or 0.4 millimetres or less, or 0.3 millimetres or less, or 0.2 millimetres or less.

According to various embodiments, the expected first distance may be between a range of 0.5 millimetre to 12 millimetres.

According to various embodiments, the object may be a tile.

According to various embodiments, the system may further include one or more suction cups disposed at the end effector, and a vacuum generator coupled to the one or more suction cups. The vacuum generator may be configured to enable suction effect through the one or more suction cups. The vacuum generator may include an air compressor coupled to a vacuum ejector.

According to various embodiments, the base may include wheels or legs.

According to various embodiments, the base may be suspended above the surface by cables or overhead rails.

According to various embodiments, the robotic arm may include a composite joint having at least three parallel prismatic joints. Each of the three parallel prismatic joints may include a revolute joint or universal joint at an end, and a spherical joint at the other end. The end effector may be coupled to the composite joint.

According to various embodiments, the system may further include an object storage apparatus. According to various embodiments, the object storage apparatus may be configured to be detachable from the system.

According to various embodiments, the system may further include a bonding material application apparatus.

According to various embodiments, the system may further include a support material application apparatus.

According to various embodiments, the processor may be configured to control a pose of the end effector via a closed-loop control mechanism based on information received from the one or more sensor units.

According to various embodiments, the end effector may further include at least one of a LiDAR sensor, or an orientation reference measurement apparatus, or a force-torque sensor, or a vibrator, or a precision rabbet with calibrated geometry utilized for measuring dimensions of the object, or a structure that provides a solid contact surface to the upper side of the object for constraining its movement in normal direction to the upper side.

According to various embodiments, the system may include two robotic arms coupled to the base.

According to various embodiments, the system may further include an auxiliary camera.

According to various embodiments, the system may further include an object cutting apparatus.

According to various embodiments, there is provided a method for placing objects on a surface. The method may include providing a system. The system may include a base, a robotic arm coupled, at an end thereof, to the base, an end effector coupled to the other end of the robotic arm. The end effector may be configured for releaseably coupling to an object to be placed on the surface. The system may further include one or more sensor units on a sensor frame. The one or more sensor units may be configured for sensing a two-dimensional profile data including at least two two-dimensional profiles together comprising at least three boundary portions of the object to be placed and at least three boundary portions of objects on the surface. At least two of the three boundary portions of the object to be placed may be from substantially non-parallel sides. At least two of the three boundary portions of the objects on the surface may be from substantially non-parallel sides. The system may further include a processor configured to determine at least three degrees of freedom of the object to be placed with respect to the sensor frame and six degrees of freedom of the sensor frame with respect to the objects on the surface in a three-dimensional space for determining a current pose of the object to be placed with respect to the objects on the surface based on the two-dimensional profile data. The method may further include placing, using the system, the object based on differences between the current pose and a desired pose of the object to be placed determined from a model of objects on the surface in the three-dimensional space.

According to various embodiments, the method may further include picking up the object to be placed using the end effector of the robotic arm. The method may further include measuring a pose of the object on the end effector using the one or more sensor units. The method may further include placing the object relative to object on the surface.

The method may further include measuring the pose of the placed object using the one or more sensor units.

According to various embodiments, the method may further include picking up a further object using the end effector of the robotic unit. The method may further include measuring a pose of the further object on the end effector using the one or more sensor units. The method may further include placing the further object relative to one or more objects on the surface. The method may further include measuring the pose of the placed and released further object using the one or more sensor units.

According to various embodiments, the method may further include measuring dimensions of the object to be placed using the one or more sensor units.

According to various embodiments, the method may further include measuring the surface where the next object is to be placed using the one or more sensor units.

According to various embodiments, the method may further include continuously measuring the pose of the object on the end effector. The method may further include controlling the pose of the object on the end effector relative to the one or more objects on the surface based on the continuously measured poses of the object on the end effector.

According to various embodiments, the method may further include building up the model of the placed objects. The method may further include determining a pose for the object to be placed based on the model of the placed objects.

According to various embodiments, the method may further include placing one or more physical border references on the surface with a pre-defined offset from where the sides of the objects to be placed are desired. The method may further include loading the system with the objects. The method may further include and placing the system in a work area.

According to various embodiments, the method may further include applying bonding material. The method may include applying bonding material on a back surface of the object to be placed. The method may include applying bonding material on the surface on which the object is to be placed.

According to various embodiments, the method may further include applying support material on at least one side of the object to be placed.

According to various embodiments, the method may further include receiving a predetermined information for placing a first set of the objects.

According to various embodiments, the method may further include the predetermined information may be selected from a group of information consisting of: dimensions, mass, surface properties, ideal desired poses or arrangement of the first set of the objects and properties of one or more physical border references.

According to various embodiments, the predetermined information may include shape and dimensions of the surface on which the first set of objects is to be placed.

According to various embodiments, the method may further include receiving a predetermined information required for placing a second set of objects. The method may further include placing one or more physical border references on the surface with a pre-defined offset from where the sides of the second set of the objects to be placed are desired. The method may further include loading the system with the second objects. The method may further include placing the system in the work area.

Various embodiments have provided a system having sensing capabilities on an end effector that would enable measuring sufficiently many degrees of freedom of the involved objects (both gripped and placed previously) to achieve an accurate placement in the presence of a bonding material (which can lead to small changes in the poses of objects shortly after placement which need to be preceived and taken into account) or actively compensate for the movement of the gripped object during placement (due to forces from interactions with the bonding material). Further, these sensing capabilities may also enable placement of objects so as to follow a curved surface (normal vector of upper surface of an object approximately in parallel with normal vector of surface underneath).

Various embodiments have also provided a system that recognizes the need to control the application of the bonding material to (a) have more controlled interactions of it with the object to be placed and/or the surface (e.g. of force experienced by manipulator during placement) and to (b) avoid an inadequate uncontrolled application negatively affect the sensing during placement and the bonding and support of the objects long after placement and to (c) potentially adjust for unevenness in the planar surface and to (d) in general ensure the object's weight is adequately supported after its release so its pose remains stable, all in order to achieve a robust process. Further, this may allow achieving a slightly inclined surface formed by the upper surfaces of the objects with respect to the surface the objects are placed on.

Various embodiments have also provided a system that recognizes the need for closed-loop control of the pose (position and orientation in 3-dimensional space) of the object to be placed, with respect to a fixed reference frame (e.g. on the surface), in order to eliminate the influence of kinematic errors from the robotic arm, and/or the need of various additional measures such as model-based active compensation against the accumulation of local errors to critical global errors, and implemented such closed-loop control and modelling for active compensation in the system.

Various embodiments have provided a system that combines a low rate "visual" position control loop with high-bandwidth joint level control to achieve good control behaviour, which is considered superior than an image-based or a position based visual servoing without use of manipulator joint feedback.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. A system for placing objects on a surface comprising:
   a base;
   a robotic arm coupled, at an end thereof, to the base;
   an end effector coupled to the other end of the robotic arm, wherein the end effector is configured for releaseably coupling to an object to be placed on the surface;
   one or more sensor units on a sensor frame, wherein the one or more sensor units is configured for sensing a two-dimensional profile data including at least two two-dimensional profiles together comprising at least three boundary portions of the object to be placed and at least three boundary portions of objects on the surface, wherein at least two of the three boundary portions of the object to be placed are from substantially non-parallel sides, and wherein at least two of the three boundary portions of the objects on the surface are from substantially non-parallel sides; and a processor configured to determine at least three degrees of freedom of the object to be placed with respect to the sensor frame and six degrees of freedom of the sensor frame with respect to the objects on the surface in a three-dimensional space for determining a current pose of the object to be placed with respect to the objects on the surface based on the two-dimensional profile data, wherein the system is configured to place the object based on differences between the current pose and a desired pose of the object to be placed determined from a model of objects on the surface in the three-dimensional space.

2. The system as claimed in claim 1, wherein the one or more sensor units comprises at least two profile sensors or wherein the one or more sensor units comprises one or more imaging devices and one or more light emitting units.

3. The system as claimed in claim 2, wherein the one or more light emitting units are configured to project a single line or multiple lines or a predetermined pattern of lines.

4. The system as claimed in claim 1, wherein the one or more sensor units are mounted to an expandable frame structure coupled to the end effector or wherein the one or more sensor units are mounted to a fixed-sized frame structure coupled to the end effector.

5. The system as claimed in claim 1, wherein the robotic arm is configured to place the object with a resulting gap between the placed object and the object on the surface, wherein the resulting gap is a first distance, and wherein differences between the first distance and an expected first distance is 0.5 millimeters or less, and preferably the expected first distance is between a range of 0.5 millimeter to 12 millimeters.

6. The system as claimed in claim 1, wherein the object is a tile.

7. The system as claimed in claim 1, further comprising:
one or more suction cups disposed at the end effector;
a vacuum generator coupled to the one or more suction cups, wherein the vacuum generator is configured to enable suction effect through the one or more suction cups.

8. The system as claimed in claim 1, wherein the base comprises wheels or legs or wherein the base is suspended above the surface by cables or overhead rails;
and/or
wherein the robotic arm comprises a composite joint having at least three parallel prismatic joints, wherein each of the three parallel prismatic joints comprises a revolute joint or universal joint at an end and a spherical joint at the other end, and wherein the end effector is coupled to the composite joint.

9. The system as claimed in claim 1, further comprising an object storage apparatus and preferably wherein the object storage apparatus is configured to be detachable from the system.

10. The system as claimed in claim 1, further comprising a bonding material application apparatus and/or further comprising a support material application apparatus.

11. The system as claimed in claim 1, wherein the processor is configured to control a pose of the end effector via a closed-loop control mechanism based on information received from the one or more sensor units and/or wherein the end effector further comprises at least one of
a LiDAR sensor, or
an orientation reference measurement apparatus, or
a force-torque sensor, or
a vibrator, or
a precision rabbet with calibrated geometry utilized for measuring dimensions of the object, or
a structure that provides a solid contact surface to the upper side of the object for constraining its movement in normal direction to the upper side.

12. The system as claimed in claim 1, wherein the system comprises two robotic arms coupled to the base and/or further comprising an auxiliary camera, and/or further comprising an object cutting apparatus.

13. A method for placing objects on a surface, the method comprising:
providing a system comprising
a base,
a robotic arm coupled, at end thereof, to the base,
an end effector coupled to the other end of the robotic arm,
wherein the end effector is configured for releaseably coupling to an object to be placed on the surface,
one or more sensor units on a sensor frame, wherein the one or more sensor units is configured for sensing a two-dimensional profile data including at least two two-dimensional profiles together comprising at least three boundary portions of the object to be placed and at least three boundary portions of objects on the surface, wherein at least two of the three boundary portions of the object to be placed are from substantially non-parallel sides, and wherein at least two of the three boundary portions of the objects on the surface are from substantially non-parallel sides, and
a processor configured to determine at least three degrees of freedom of the object to be placed with respect to the sensor frame and six degrees of freedom of the sensor frame with respect to the objects on the surface in a three-dimensional space for determining a current pose of the object to be placed with respect to the objects on the surface based on the two-dimensional profile data; and
placing, using the system, the object based on differences between the current pose and a desired pose of the object to be placed determined from a model of objects on the surface in the three-dimensional space.

14. The method as claimed in 13, further comprising
picking up the object to be placed using the end effector of the robotic arm;
measuring a pose of the object on the end effector using the one or more sensor units;
placing the object relative to object on the surface;
measuring the pose of the placed object using the one or more sensor units;
and/or
picking up a further object using the end effector of the robotic unit;
measuring a pose of the further object on the end effector using the one or more sensor units;
placing the further object relative to one or more objects on the surface; and
measuring the pose of the placed and released further object using the one or more sensor units.

15. The method as claimed in claim 13, further comprising measuring dimensions of the object to be placed using the one or more sensor units and/or further comprising measuring the surface where the next object is to be placed using the one or more sensor units.

16. The method as claimed in claim 13, further comprising:
- continuously measuring the pose of the object on the end effector;
- controlling the pose of the object on the end effector relative to the one or more objects on the surface based on the continuously measured poses of the object on the end effector.

17. The method as claimed in claim 13 further comprising:
- building up the model of the placed objects; and
- determining a pose for the object to be placed based on the model of the placed objects;

and/or
- placing one or more physical border references on the surface with a pre-defined offset from where the sides of the objects to be placed are desired;
- loading the system with the objects; and
- placing the system in a work area.

18. The method as claimed in claim 13 further comprising applying bonding material and/or further comprising applying support material on at least one side of the object to be placed and/or further comprising receiving a predetermined information for placing a first set of the objects.

19. The method as claimed in claim 18, wherein the predetermined information is selected from a group of information consisting of: dimensions, mass, surface properties, ideal desired poses or arrangement of the first set of the objects and properties of one or more physical border references, preferably wherein the predetermined information comprises shape and dimensions of the surface on which the first set of objects is to be placed.

20. The method as claimed in claim 13, further comprising:
- receiving a predetermined information required for placing a second set of objects;
- placing one or more physical border references on the surface with a pre-defined offset from where the sides of the second set of the objects to be placed are desired;
- loading the system with the second objects; and
- placing the system in the work area.

* * * * *